(12) United States Patent
Mamiya et al.

(10) Patent No.: US 6,244,243 B1
(45) Date of Patent: Jun. 12, 2001

(54) CONTROL DEVICE FOR DIRECT INJECTION ENGINE AND AN INJECTION ENGINE PROVIDED WITH A CONTROLLER

(75) Inventors: Kiyotaka Mamiya; Michihiro Imada; Masayuki Tetsuno, all of Fuchu-cho (JP)

(73) Assignee: Mazda Motor Corporation, Hiroshima-ken (JP)

(*) Notice: Subject to any disclaimer, the term of this patent is extended or adjusted under 35 U.S.C. 154(b) by 0 days.

(21) Appl. No.: 09/481,112

(22) Filed: Jan. 11, 2000

(30) Foreign Application Priority Data

Jan. 14, 1999 (JP) ................................................ 11-007233

(51) Int. Cl.$^7$ .......................... F02B 17/00; F02B 23/10; F02D 43/00
(52) U.S. Cl. .................... 123/295; 123/399; 123/406.51; 123/486
(58) Field of Search .................................. 123/295, 305, 123/399

(56) References Cited

U.S. PATENT DOCUMENTS 5,628,290 * 5/1997 Iida et al. ............................ 123/305
5,878,711 * 3/1999 Kamura et al. ..................... 123/295
5,947,079 * 9/1999 Sivashankar et al. .............. 123/295
6,024,069 * 2/2000 Yoshino .............................. 123/295
6,058,906 * 5/2000 Yoshino .............................. 123/295
6,167,863 * 1/2001 Kazama et al. ..................... 123/295

FOREIGN PATENT DOCUMENTS 4362221   12/1992   (JP) .
7301139   11/1995   (JP) .

* cited by examiner

Primary Examiner—Tony M. Argenbright
(74) Attorney, Agent, or Firm—Brooks & Kushman P.C.

(57) ABSTRACT

A control device for controlling a direct injection engine provided with an injector for injecting fuel directly into a combustion chamber in a cylinder thereof and a throttle valve is switchable between a stratified charge combustion mode and a uniform charge combustion mode. The control device predicts switching to the uniform charge combustion mode based on a change in the target load Piobj during engine acceleration in the stratified charge combustion mode, and corrects the target load Piobj so that the opening of the throttle valve approaches the opening suited for the uniform charge combustion mode prior to the switching to the uniform charge combustion mode when such combustion mode switching has been predicted. This control device prevents torque shock due to the combustion mode switching during engine acceleration without causing a deterioration in fuel economy or in vehicle acceleration performance.

20 Claims, 11 Drawing Sheets

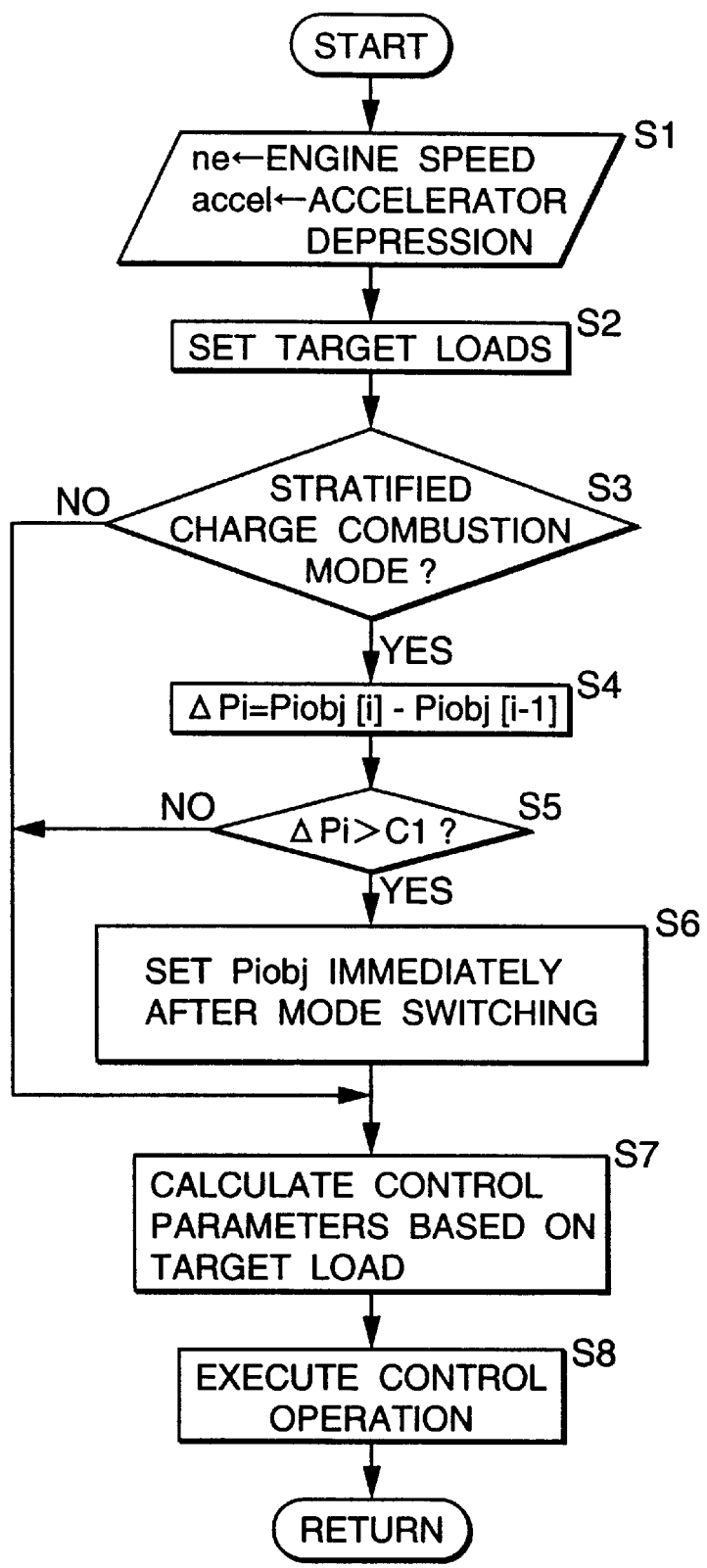

CONTROL DEVICE FOR DIRECT INJECTION ENGINE AND AN INJECTION ENGINE PROVIDED WITH A CONTROLLER

This application is based on patent application No. 11-7233 filed in Japan, the contents of which are hereby incorporated by reference.

BACKGROUND OF THE INVENTION

This invention relates to a control device for a direct injection engine in which fuel is injected directly into a combustion chamber in a cylinder by means of a fuel injection valve, and such an injection engine. More particularly, the invention is concerned with a technique of throttle control during acceleration of a direct injection engine which can be switched between uniform charge combustion mode and stratified charge combustion mode.

A known example of a conventional control device for this type of direct injection engine is found in Japanese Unexamined Patent Publication No. 7-301139, in which the engine is operated in stratified charge combustion mode by injecting the fuel into a cylinder during a compression stroke in a specific low-speed, low-load operating range of the engine while it is operated in uniform charge combustion mode by injecting the fuel into the cylinder during an intake stroke in other operating ranges. More specifically, a region of a relatively rich mixture is formed close to a spark plug and a stratiform mixture is formed around the region of the rich mixture in the stratified charge combustion mode. Since the engine is run at an extremely high average air-fuel ratio within a combustion chamber in the stratified charge combustion mode, it is possible to significantly increase the opening of a throttle valve compared to its opening in the uniform charge combustion mode, and this helps decrease pumping loss of the engine and achieve a reduction in fuel cost.

The aforementioned control device for the direct injection engine however has a problem that torque shock occurs when the engine is switched from the stratified charge combustion mode to the uniform charge combustion mode during acceleration, for instance. Since the throttle opening in the stratified charge combustion mode is larger than the throttle opening in the uniform charge combustion mode as stated above, the throttle valve is usually closed for an instant when the combustion mode is switched during engine acceleration. Even if the throttle valve is temporarily closed in this fashion, there occurs a considerable time delay before the charging efficiency in the cylinder actually drops and, therefore, the charging efficiency in the cylinder increases up to an excessive level, thereby increasing engine torque excessively when the engine is switched to the uniform charge combustion mode.

One approach to reducing such variations in engine torque would be to control the throttle valve in such a way that its opening becomes as small as possible in the stratified charge combustion mode. Even when this approach is used, however, the opening of the throttle valve is increased in accordance with an increase in target load level during acceleration of the engine, so that the throttle opening is fairly large immediately before the engine is switched to the uniform charge combustion mode and the aforementioned torque shock inevitably occurs after all at the time of combustion mode switching.

Another approach would be to delay the switching to a fuel injection pattern of the uniform charge combustion mode until the amount of intake air decreases as disclosed in Japanese Unexamined Patent Publication No. 4-36221, or to temporarily close the throttle valve as described above and delay the switching of the fuel injection pattern until the charging efficiency in the cylinder actually decreases, when switching the engine to the uniform charge combustion mode. Even when such an approach is taken, however, there arises a problem that vehicle acceleration performance deteriorates since transition to the uniform charge combustion mode is practically retarded, also causing a delay in increasing the amount of fuel.

Still another approach would be to forcibly decrease the engine torque by retarding ignition timing by a specific time period to alleviate the torque shock when switching the combustion mode. However, this approach makes it necessary to significantly retard the ignition timing so that there arises a problem that fuel economy considerably deteriorates. Furthermore, the reliability of a catalyst for converting exhaust gas might be impaired due to an excessive increase in exhaust gas temperature.

SUMMARY OF THE INVENTION

It is an object of the invention to provide a control device for a direct injection engine and an injection engine which have overcome the problems residing in the prior art.

It is another object of the invention to provide a control device for a direct injection engine and an injection engine which can be switched between uniform charge combustion mode and stratified charge combustion mode, the control device employing an innovative throttle valve control sequence which makes it possible to prevent torque shock at combustion mode switching without causing such problems as deterioration in vehicle acceleration performance or in fuel economy.

According to an aspect of the invention, a control device for controlling a direct injection engine predicts a switching from a stratified charge combustion mode to a uniform charge combustion mode, and makes a correction to the opening of a throttle valve so that it becomes approximately equal to a throttle opening suited for the uniform charge combustion mode prior to the switching of the combustion mode.

According to another aspect of the invention, an injection engine comprises: a cylinder having a combustion chamber; a fuel injection valve for injecting fuel directly into the combustion chamber; a spark plug; a throttle valve for regulating the amount of intake air introduced into the combustion chamber; and a controller. The controller switchingly sets a stratified charge combustion mode where the fuel is injected in a compression stroke of the cylinder to produce a stratified mixture around the spark plug and burnt in a stratified state and a uniform charge combustion mode where the fuel is injected in an intake stroke of the cylinder to produce a uniformly distributed mixture therein and burnt in a uniform state, and sets a target load according at least to the amount of depression of an accelerator pedal, and controls the opening of the throttle valve according at least to the set target load, and predicts a switching from the stratified charge combustion mode to the uniform charge combustion mode, and corrects a control target value for the set throttle valve so that the control target value approaches a target value which will become valid in the uniform charge combustion mode prior to the switching to the uniform charge combustion mode when such combustion mode switching has been predicted.

The control device is useable for an engine provided with a fuel injection valve for injecting fuel directly into a combustion chamber in a cylinder thereof, a throttle valve for regulating the amount of intake air introduced into the combustion chamber, and a spark plug.

The control device is provided with a mode setter for switchingly setting a stratified charge combustion mode where the fuel injection valve injects the fuel in a compression stroke of the cylinder to produce a stratified mixture around the spark plug and the mixture is burnt in a stratified state and a uniform charge combustion mode where the fuel injection valve injects the fuel in an intake stroke of the cylinder to produce a uniformly distributed mixture therein and the mixture is burnt in a uniform state, a target load setter a for setting a target load of the engine according at least to the amount of depression of an accelerator pedal, a throttle controller for controlling the opening of the throttle valve according at least to the target load set by the target load setter, a mode change predictor for predicting a switching from the stratified charge combustion mode to the uniform charge combustion mode, and a throttle control corrector for correcting a control target value for the throttle valve set by the throttle controller so that the control target value approaches a target value which will become valid in the uniform charge combustion mode prior to the switching to the uniform charge combustion mode when such combustion mode switching has been predicted by the mode change predictor.

These and other objects, features and advantages of the invention will become more apparent upon reading the following detailed description in conjunction with the accompanying drawings.

BRIEF DESCRIPTION OF THE DRAWINGS

FIG. 15 is a flowchart showing a routine of control operation to be performed during engine acceleration.

DETAILED DESCRIPTION OF THE PREFERRED EMBODIMENTS OF THE INVENTION

Figure 1:
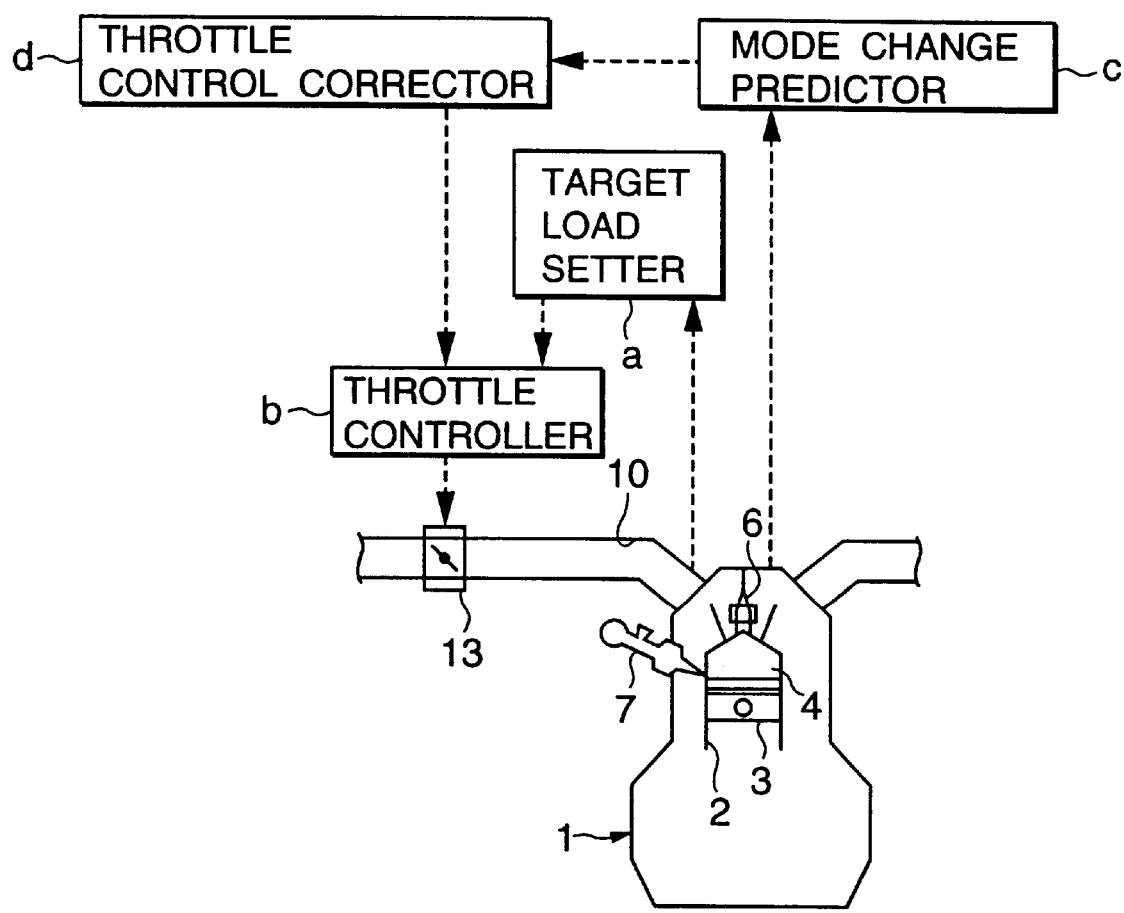
FIG. 1 is an explanatory diagram generally showing a construction of a control device for a direct injection engine according to an embodiment of the invention.
Figure 2:
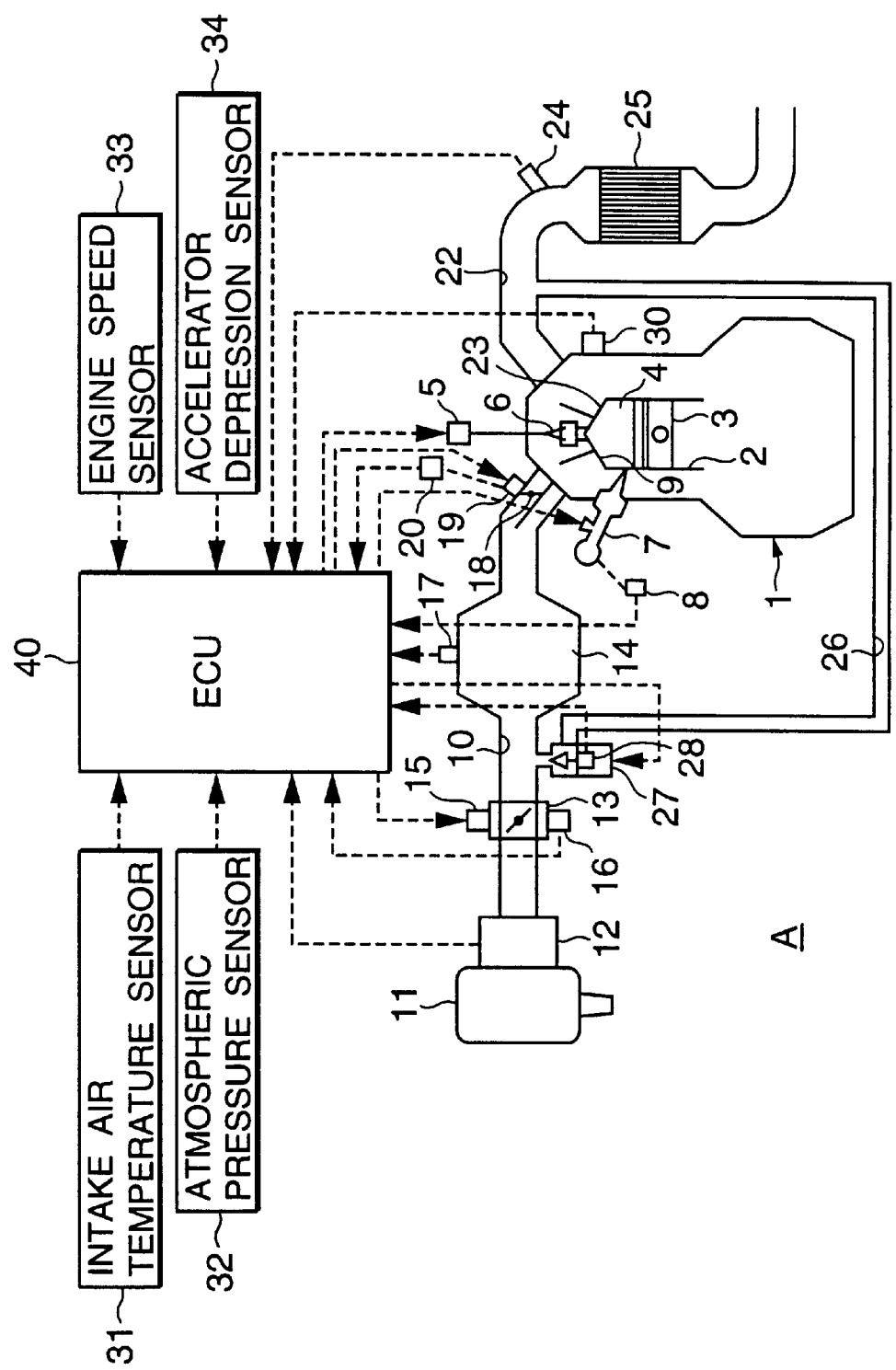
FIG. 2 is a schematic configuration diagram of the control device.

FIG. 2 shows an overall construction of a direct injection engine control device A according to an embodiment of the invention, in which designated by the numeral 1 is a multicylinder engine mounted on a vehicle, for example. This engine 1 has a plurality of cylinders 2 (of which only one is illustrated), and a piston 3 is fitted in each cylinder 2, forming a combustion chamber 4 therein, in a manner that the piston 3 can reciprocate in the relevant cylinder 2. A spark plug 6 connected to an ignition circuit 5 is fitted in an upper wall of the combustion chamber 4 just on the cylinder axis in such a way that a spark gap of the spark plug 6 is located in the inner space of the combustion chamber 4. Also, an injector (fuel injection valve) 7 for injecting fuel directly into the combustion chamber 4 is mounted in a portion of a side wall of the combustion chamber 4 where interference with the reciprocating piston 3 does not occur.

Although not illustrated, a fuel supply circuit including a high-pressure fuel pump and a pressure regulator is connected to the injector 7. The fuel supply circuit supplies the fuel from a fuel tank to the injector 7 while regulating the fuel to an appropriate pressure. There is also provided a fuel pressure sensor 8 for detecting the fuel pressure. When the fuel is injected by the injector 7 in a latter part of a compression stroke of a particular cylinder 2, a resultant fuel spray is trapped by a cavity (not shown) formed in a top surface of the piston 3 and a relatively rich mixture layer is produced in the vicinity of the spark plug 6. On the other hand, when the injector 7 injects the fuel during an intake stroke of the cylinder 2, a resultant fuel spray spreads in the combustion chamber 4 and mixed with intake air, producing a uniform mixture within the combustion chamber 4.

The combustion chamber 4 is connected to an intake passage 10 through two unillustrated intake ports in which intake valves 9 are provided. The intake passage 10 supplies intake air filtered by an air cleaner 11 to each combustion chamber 4 of the engine 1. A heat-sensitive airflow sensor 12 for detecting the amount of intake air supplied to the engine 1, an electrically-operated throttle valve 13 for constricting the intake passage 10 and a surge tank 14 are disposed in this order in the intake passage 10 from its upstream side to downstream side. The electrically-operated throttle valve 13 is not mechanically connected to an accelerator pedal which is not shown but is opened and closed by a motor 15. Further, a throttle opening sensor 16 for detecting the opening of the throttle valve 13 and an intake air pressure sensor 17 for detecting the pressure of the intake air inside the surge tank 14 are provided in the intake passage 10.

The intake passage 10 branches out downstream of the surge tank 14 into independent passages for the individual cylinders 2. A downstream terminal portion of each independent passage further branches out into two separate channels which are connected to the two intake ports, and a swirl control valve 18 is provided in one of these separate channels. The swirl control valve 18 is opened and closed by an actuator 19. When the swirl control valve 18 in one separate channel is closed, intake air is supplied to the combustion chamber 4 only through the other separate channel, thereby producing a strong swirl of intake air within the combustion chamber 4. On the other hand, as the swirl control valve 18 is opened, the intake air swirl gradually diminishes. There is also provided a swirl control valve opening sensor 20 for detecting the opening of the swirl control valve 18.

Designated by the numeral 22 in FIG. 2 is an exhaust passage for discharging exhaust gases from the combustion chamber 4. An upstream terminal portion of the exhaust passage 22 branches out and is connected to the combustion chamber 4 of each individual cylinder 2 through an unillustrated exhaust port in which an exhaust valve 23 is provided. A carbon dioxide ($O_2$) sensor 24 for measuring the concentration of oxygen in the exhaust gases and a catalytic converter 25 for converting the exhaust gases are disposed in this order in the exhaust passage 22 from its upstream side to downstream side. The $O_2$ sensor 24 is used for detecting the air-fuel ratio based on the oxygen concentration in the exhaust gases and has such a property that its output suddenly changes at a point where the air-fuel ratio becomes equal to the stoichiometric air-fuel ratio.

The catalytic converter 25 includes a cordierite carrier (not shown) of a honeycomb structure in which a number of through holes extending parallel to each other are made in its axial direction (along the direction of exhaust gas flow), with a catalyst layer formed on wall surfaces of the individual through holes. The catalytic converter 25 utilizes a nitrogen oxide (NOx) adsorption/reduction type lean NOx catalyst which adsorbs NOx in lean operating conditions in which the air-fuel ratio is higher than the stoichiometric air-fuel ratio, and releases the adsorbed NOx and reduces it in rich operating conditions in which the air-fuel ratio is approximately equal to or lower than the stoichiometric air-fuel ratio. It is known that the catalyst having such NOx adsorption/reduction capability has such a property that its NOx converting performance is strongly affected by temperature conditions. Specifically, although the NOx conversion rate of the catalyst is extremely high in a specific temperature range (e.g., 250° C. to 400° C.), it sharply drops as the catalyst temperature increases beyond that range.

An exhaust gas recirculation (EGR) passage 26 branches out from the $O_2$ sensor 24 to the intake passage 10. Specifically, An upstream end of the EGR passage 26 is connected to the swirl control valve opening sensor 20 upstream of the $O_2$ sensor 24 and a downstream end of the EGR passage 26 is connected to the intake passage 10 between the throttle valve 13 and the surge tank 14, so that part of the exhaust gas is returned to and mixed with the intake air. There is provided an electrically-operated EGR valve 27 whose opening can be adjusted at the downstream end of the EGR passage 26. This electrically-operated EGR valve 27 regulates the amount of the exhaust gas recirculated through the EGR passage 26. There is further provided a lift sensor 28 for detecting the lift of the EGR valve 27.

Operation of the ignition circuit 5 for the spark plug 6, the injector 7, the motor 15 for the electrically-operated throttle valve 13, the actuator 19 for the swirl control valve 18, and the electrically-operated EGR valve 27 is controlled by an electronic control unit 40 (hereinafter referred to as the ECU 40). Output signals of the airflow sensor 12, the throttle opening sensor 16, the intake air pressure sensor 17, the swirl control valve opening sensor 20, the $O_2$ sensor 24 and the lift sensor 28 for the EGR valve 27 are entered to the ECU 40. Also entered to the ECU 40 are output signals of a water temperature sensor 30 for detecting the temperature of cooling water of the engine 1, an intake air temperature sensor 31 for detecting the temperature of the intake air, an atmospheric pressure sensor 32 for detecting atmospheric pressure, an engine speed sensor 33 for detecting engine speed, and an accelerator depression sensor 34 for detecting the amount of depression of the accelerator pedal.

Overview of Engine Control

Figure 8:
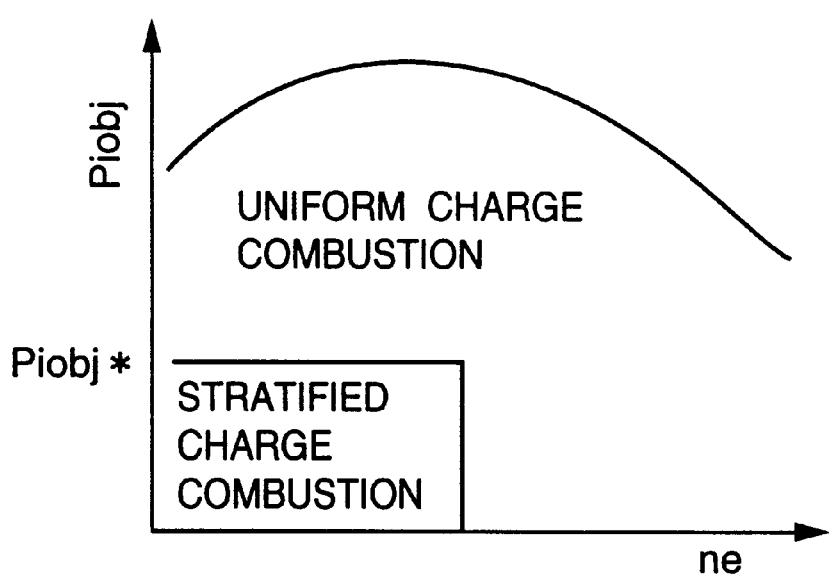
FIG. 8 is a diagram showing a map defining stratified charge combustion mode and uniform charge combustion mode operating ranges.

In this embodiment, fuel injection pattern (e.g., fuel injection timing and air-fuel ratio) of the engine 1 is switched according to its operating conditions so that it operates in different states of combustion as shown in FIG. 8. Specifically, the engine 1 is run in stratified charge combustion mode in a specific low-speed, low-load operating range (stratified charge combustion range) and in uniform charge combustion mode in other than the low-speed, low-load operating range (uniform charge combustion range). In the stratified charge combustion mode, the injector 7 injects the fuel in the latter part of the compression stroke and the fuel is burnt in a stratified state in which a richer mixture is locally distributed in the vicinity of the spark plug 6. Since the opening of the throttle valve 13 is increased in the stratified charge combustion mode to reduce pumping loss of the engine 1, the average air-fuel ratio throughout the combustion chamber 4 becomes considerably high (e.g., A/F=30).

In the uniform charge combustion mode, on the other hand, the fuel is injected in an early part of the intake stroke by the injector 7 and is sufficiently mixed with the intake air to produce a uniform mixture within the combustion chamber 4 before combustion. In this combustion mode, the amount of injected fuel and the opening of the throttle valve 13 are controlled such that the air-fuel ratio within the combustion chamber 4 equals the stoichiometric air-fuel ratio (A/F=14.7). It is to be noted, however, that the air-fuel ratio may be made smaller than the stoichiometric air-fuel ratio (e.g., A/F=13 to 14) in high-load or high-speed ranges in the uniform charge combustion mode.

Figure 3:
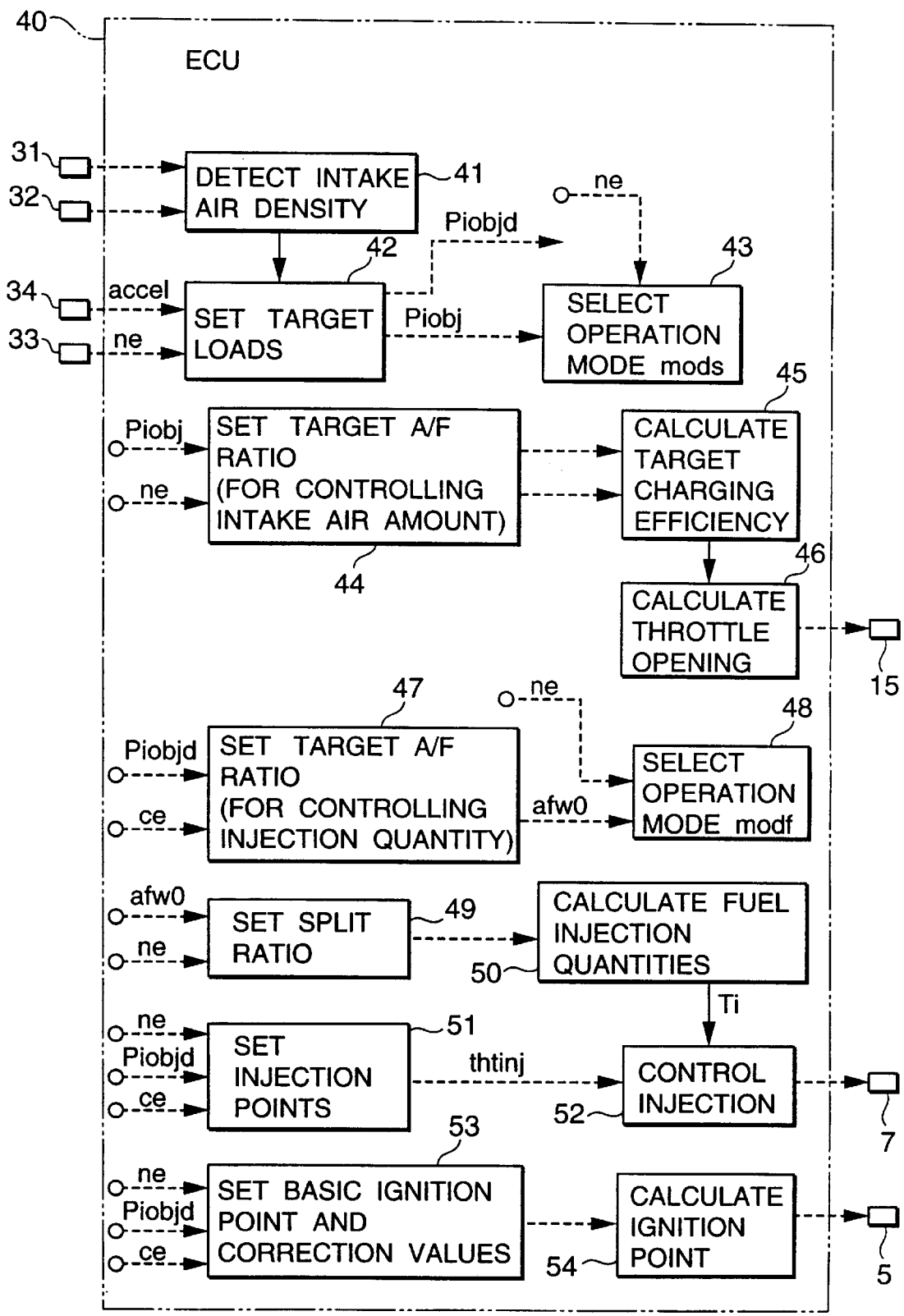
FIG. 3 is a functional block diagram of an electronic control unit (ECU)

FIG. 3 is a functional block diagram showing how the ECU 40 performs basic engine control operations. The ECU 40 comprises an intake air density detector 41 for detecting the density of the intake air based on the signals from the intake air temperature sensor 31 and the atmospheric pressure sensor 32 as well as a target load setter 42 for setting a target load level for the engine 1 based on the output signals of the engine speed sensor 33 and the accelerator depression sensor 34 and also taking into account the density of the intake air.

Figure 4:
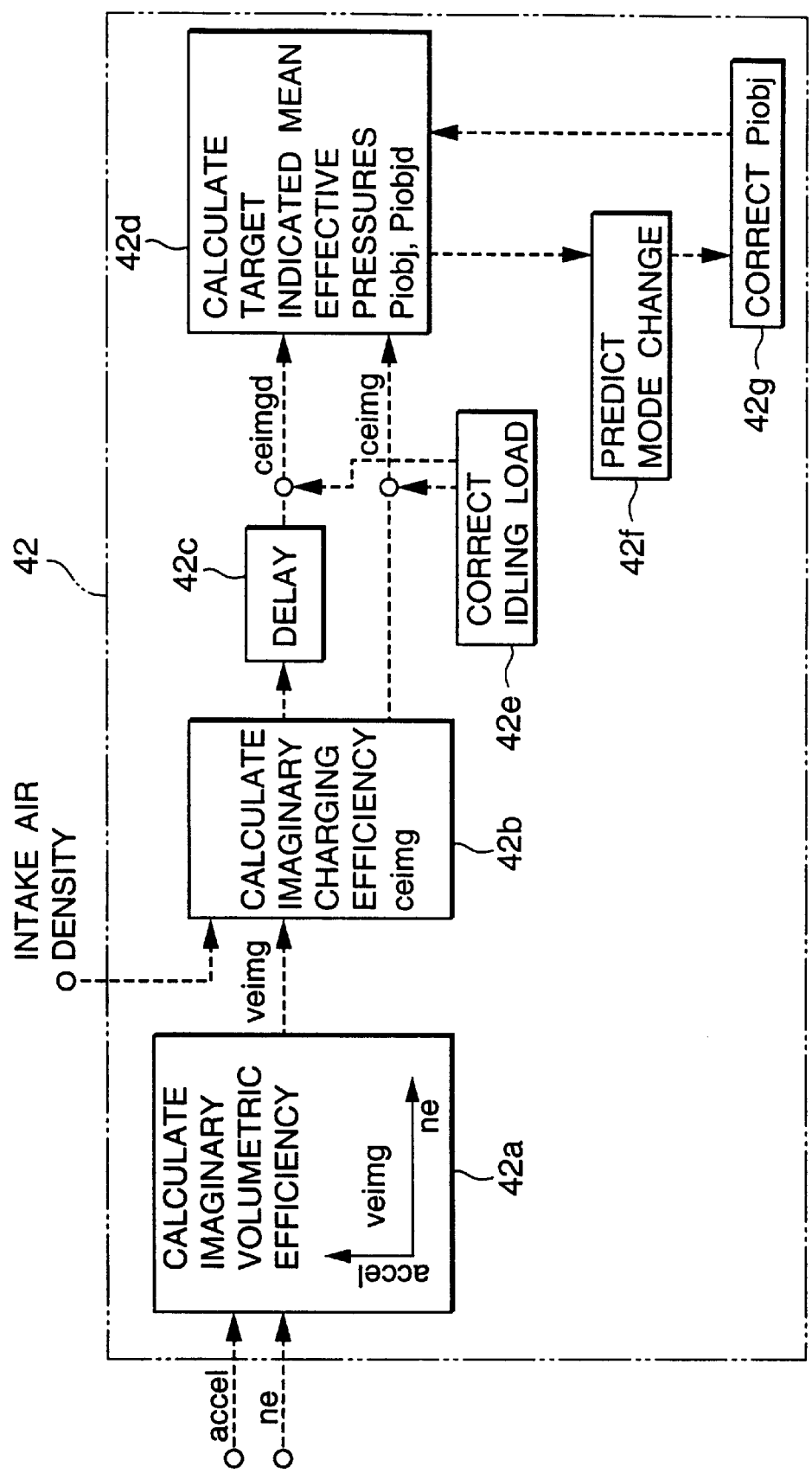
FIG. 4 is a functional block diagram showing a specific configuration of a target load setter shown in FIG. 3.
Figure 7:
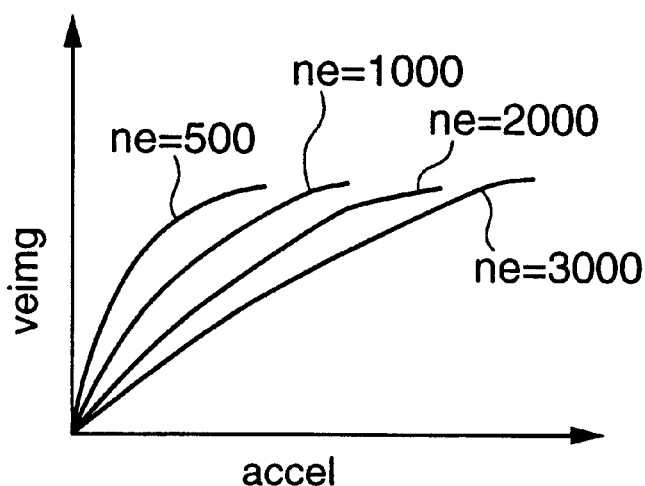
FIG. 7 is a diagram showing a relationship between accelerator depression and engine speed and imaginary volumetric efficiency.

In the target load setter 42, an imaginary volumetric efficiency calculator 42a first calculates imaginary volumetric efficiency veimg based on accelerator depression accel and engine speed ne as shown in FIG. 4. More particularly, a relationship between the accelerator depression accel and engine speed ne and the imaginary volumetric efficiency veimg is ascertained by a bench test previously conducted under standard atmospheric conditions and under standard operating conditions, in which the air-fuel ratio was maintained at the stoichiometric air-fuel ratio so that necessary engine output performance could be obtained, and the relationship thus obtained is stored in the form of a map in a memory of the ECU 40. The imaginary volumetric efficiency veimg corresponding to the actual accelerator depression accel and engine speed ne is read from this map. The relationship between the accelerator depression accel and engine speed ne and the imaginary volumetric efficiency veimg is expressed as shown in FIG. 7, for example, from which it can be seen that the imaginary volumetric efficiency veimg increases as the accelerator depression accel increases and as the engine speed ne decreases.

Next, an imaginary charging efficiency calculator 42b calculates imaginary charging efficiency ceimg based on the imaginary volumetric efficiency veimg derived as described above and the intake air density detected by the intake air density detector 41. The imaginary charging efficiency ceimg thus obtained is the charging efficiency corresponding to the output required for the engine 1. A smoothing processor (delay processor) 42c makes a first-order delay correction to the imaginary charging efficiency ceimg as expressed by the following equation. In other words, a delay operation is performed on the imaginary charging efficiency ceimg.

$$ceimgd = (1-\alpha) \times ceimg + \alpha \times ceimgd[i-1] \quad (1)$$

wherein ceimgd[i−1] denotes a previous value of ceimgd and α denotes a coefficient.

Subsequently, a target load calculator 42d calculates indicated mean effective pressures (Pi) as first and second target loads based on the imaginary charging efficiency ceimg calculated by the imaginary charging efficiency calculator 42b and imaginary charging efficiency ceimgd obtained through the delay operation performed by the smoothing processor 42c, respectively. More specifically, the first target load Piobj is calculated based on the imaginary charging efficiency ceimg which has not gone through the delay operation while the second target load Piobjd is calculated based on the imaginary charging efficiency ceimgd obtained through the delay operation.

$$Piobj = K1 \times ceimg + K2$$
$$Piobjd = K1 \times ceimgd + K2 \quad (2)$$

The target load setter 42 also includes an idling load correction circuit 42e which makes corrections to the imaginary charging efficiencies ceimg, ceimgd before the target load calculator 42d calculates the aforementioned target loads Piobj, Piobjd. These corrections are made to increase the engine output to make up for an additional external load which will be added when an air-conditioner is started during idling operation of the engine 1, for example.

What is characteristic of this invention is that the target load setter 42 further includes a mode change predictor 42f which predicts the switching of operation mode (combustion mode) from the stratified charge combustion mode to the uniform charge combustion mode during acceleration of the engine 1 and a correction circuit 42g which corrects the first target load Piobj when the switching of the operation mode has been predicted by the mode change predictor 42f so that the first target load Piobj becomes a value suited for the uniform charge combustion mode before the operation mode is actually switched. While control operation performed by the mode change predictor 42f and the correction circuit 42g will be described later in detail, throttle opening tvoobj is corrected in such a way that it approaches a control target value for the uniform charge combustion mode when the first target load Piobj is corrected by the correction circuit 42g.

The ECU 40 also comprises an operation mode setter 43 which selects a basic operation mode mods based on the first target load Piobj obtained as described above and the engine speed ne. Specifically, the operation mode setter 43 selects the stratified charge combustion mode in the operating range (stratified charge combustion range) in which the first target load Piobj is smaller than a specific low-load side threshold value Piobj* and the engine speed ne is low, while it selects the uniform charge combustion mode in other operating range (uniform charge combustion range) as shown in FIG. 8.

Also, the ECU 40 determines values of various control parameters related to the engine output. Specifically, the ECU 40 determines the values of such control parameters as the amount of intake air which is regulated by the throttle valve 13, the amount of recirculated exhaust gas which is regulated by the EGR valve 27, the strength of the intake air swirl which is regulated by the swirl control valve 18, the amount of fuel injected by the injector 7 and its injection timing, as well as ignition timing of the spark plug 6, according to the first and second target loads Piobj, Piobjd and the engine speed ne.

Among the aforementioned control parameters, the amount of intake air, the amount of recirculated exhaust gas and the strength of the intake air swirl respond at relatively low speeds to the behavior of the throttle valve 13, the EGR valve 27 and the swirl control valve 18, respectively. Thus, control values of these parameters, that is, the throttle opening tvoobj, EGR valve opening and swirl control valve opening, are determined according to the first target load Piobj and the engine speed ne. On the other hand, since the amount of injected fuel, injection timing and ignition timing respond instantly to relevant control signals, these parameters are determined according to the second target load Piobjd obtained through the delay operation and the engine speed ne.

Throttle Control

Figure 9:
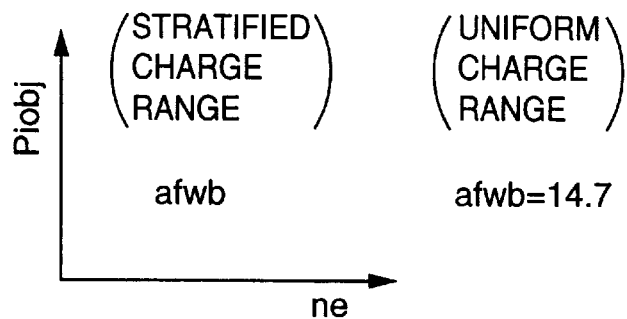
FIG. 9 is a diagram showing a map defining target air-fuel ratios for controlling the amount of intake air for the individual operation modes.

The ECU 40 comprises a target air-fuel ratio setter 44, a target charging efficiency calculator 45 and a throttle opening calculator 46 which together act as a throttle controller for controlling the throttle valve 13 according to the first target load Piobj set by the target load setter 42. The target air-fuel ratio setter 44 sets a target air-fuel ratio afwb for controlling the amount of intake air for each operation mode selected by the operation mode setter 43. Referring to FIG. 9, the target air-fuel ratio setter 44 obtains the target air-fuel ratio afwb from a map previously generated according to the first target load Piobj and the engine speed ne in the stratified charge combustion mode, while it matches the target air-fuel ratio afwb with the stoichiometric air-fuel ratio (A/F=14.7) in the uniform charge combustion mode.

The target charging efficiency calculator 45 calculates a target charging efficiency ceobj based on the first target load Piobj, or the first target load Piobj corresponding thereto, and the target air-fuel ratio afwb using the following equation, for example:

$$ceobj = ceimg \times \{(afwb + K3)/14.7\} \times K4 \quad (3)$$

The above equation (3) derives the target charging efficiency ceobj from the imaginary charging efficiency ceimg taking into account an excess-air factor (afwb/14.7) and fuel economy improvement effect at a target air-fuel ratio used when the engine 1 is operated in its lean operating conditions, wherein values of coefficients K3 and K4 are determined such that the target charging efficiency ceobj is decreased by an amount corresponding to the fuel economy improvement effect.

More specifically, since the imaginary charging efficiency ceimg is a value corresponding to a target load set when the engine 1 is operated in its standard operating conditions, it is necessary to take into account the aforementioned excess-air factor to ensure the equivalent amount of injected fuel in the lean operating conditions. If, however, the amount of injected fuel equivalent to that used at the stoichiometric air-fuel ratio is so achieved, the engine output increases in the lean operating conditions because the thermal efficiency increases due to the fuel economy improvement effect. Under this circumstance, the target charging efficiency ceobj is calculated taking into account the fuel economy improvement effect in addition to the excess-air factor as described above to obtain the engine output corresponding to the target load.

Here, ceimgd=(Piobjd−K2)/K1 from equation (2). This may be substituted into equation (3) above so that the target charging efficiency ceobj can be obtained from the first target load Piobj.

Figure 5:
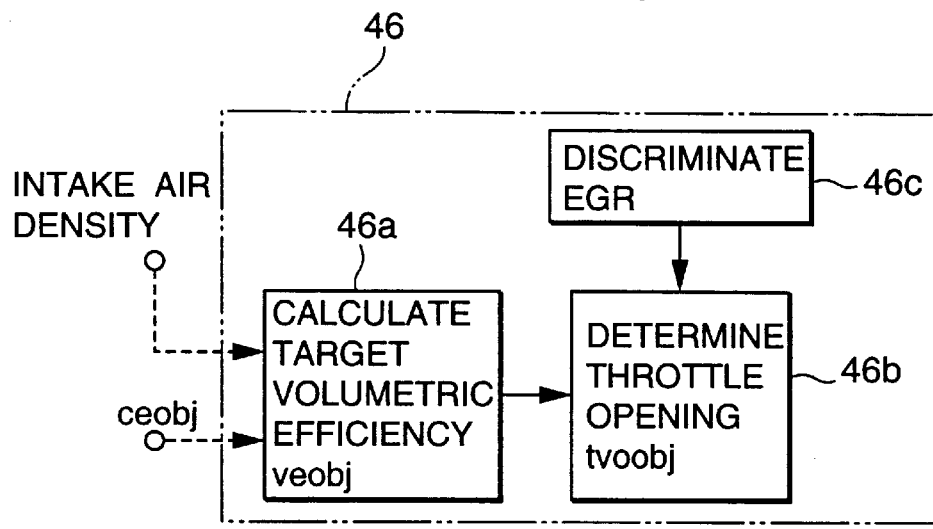
FIG. 5 is a functional block diagram showing a specific configuration of a throttle opening calculator shown in FIG. 3.

In the throttle opening calculator 46, a target volumetric efficiency calculator 46a derives a target volumetric efficiency veobj by correcting the target charging efficiency ceobj obtained as described above according to the intake air density and a throttle opening determiner 46b determines the throttle opening tvoobj based on the target volumetric efficiency veobj and the engine speed ne as shown in FIG. 5. Since the relationship between the volumetric efficiency, engine speed and throttle opening varies depending on whether EGR process is used or not, maps indicating their relationship in both cases (the EGR process is used and not used) are previously prepared and stored in a memory. With this arrangement, the throttle opening tvoobj corresponding to the target volumetric efficiency veobj and the engine speed ne is read out from one of these maps depending on a judgment as to whether the EGR process is used or not made by an EGR discriminator 46c.

Figure 10:
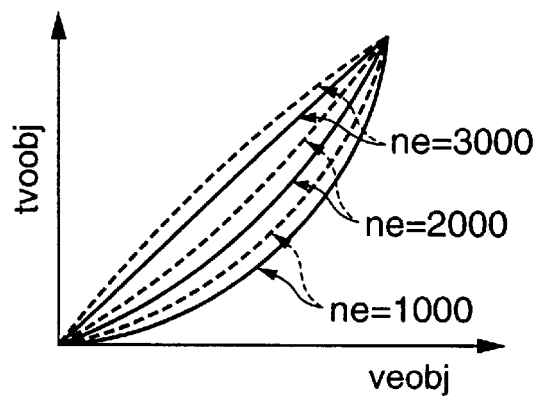
FIG. 10 is a diagram showing a relationship between volumetric efficiency and throttle opening.

Solid lines shown in FIG. 10 indicate the relationship between the volumetric efficiency, engine speed and throttle opening for the case in which the EGR process is deactivated, while broken lines in FIG. 10 indicate their relationship for the case in which the EGR process is activated. It can be seen from this Figure that the throttle opening tvoobj is increased with an increase in the target volumetric efficiency veobj and with an increase in the engine speed ne, and that the throttle opening tvoobj is made larger when the EGR process is activated than when the EGR process is deactivated.

In the stratified charge combustion mode, the air-fuel ratio of the exhaust gas becomes extremely high, so that the recirculated exhaust gas contains not only burned gases but also plenty of unused air (oxygen). Thus, when the EGR process is activate, the proportion by volume of the burned gases contained in the entire recirculated exhaust gas is determined, and the throttle opening tvoobj and the EGR valve opening are corrected according to that proportion. The amount of the recirculated exhaust gas and the strength of the swirl are also controlled according to the operating conditions of the engine 1 differently in the individual operation modes mods.

Fuel Injection Control

The ECU 40 further comprises a target air-fuel ratio generator 47, an operation mode setter 48, an injection split ratio setter 49, an injection quantity calculator 50, an injection timing setter 51 and an injection controller 52, which together act as a fuel injection controller for controlling fuel injection by the injector 7.

Figure 6:
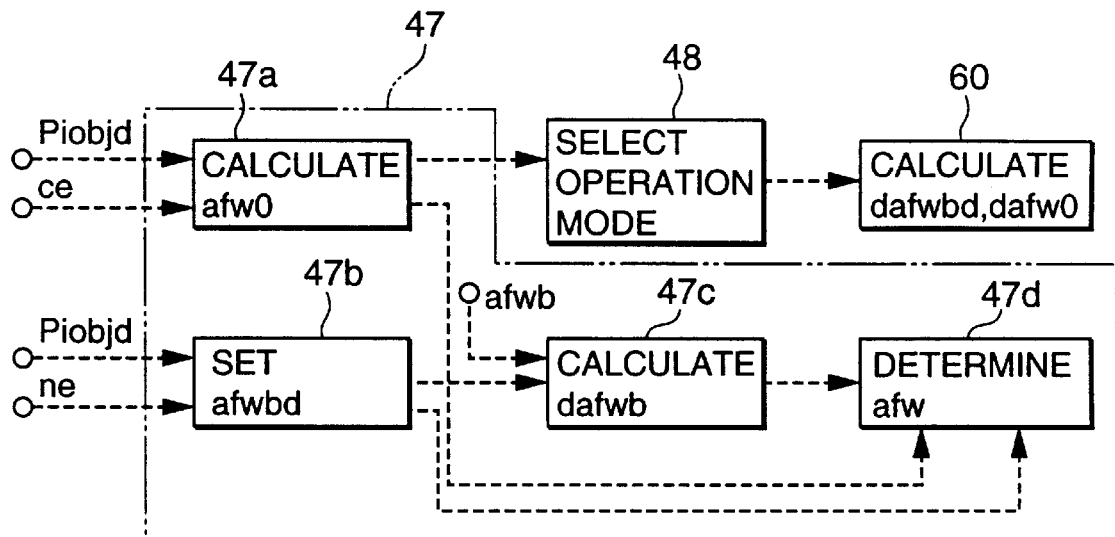
FIG. 6 is a functional block diagram showing a specific configuration of a target air-fuel ratio generator shown in FIG. 3.

The target air-fuel ratio generator 47 determines a target air-fuel ratio to be used for controlling the amount of injected fuel. More specifically, a calculator 47a calculates a target air-fuel ratio afw0 to be used mainly in a transient operating state of the engine 1 based on the second target load Piobjd, or the imaginary charging efficiency ceimgd corresponding thereto, and actual charging efficiency ce as shown in FIG. 6.

$$\text{afw0}=14.7\times K1\times ce/\{K4\times(\text{Piobjd}-K2)\}-K3[=14.7\times ce/(K4\times ce-\text{imgd})-K3] \quad (4)$$

Equation (4) above derives an air-fuel ratio which will give an engine torque corresponding to the target air-fuel ratio at the actual charging efficiency, by using the stoichiometric air-fuel ratio, the actual charging efficiency ce, the second target load Piobjd (or the imaginary charging efficiency ceimgd), and the coefficients K3, K4 for taking into account the aforementioned fuel economy improvement effect.

Figure 12A:
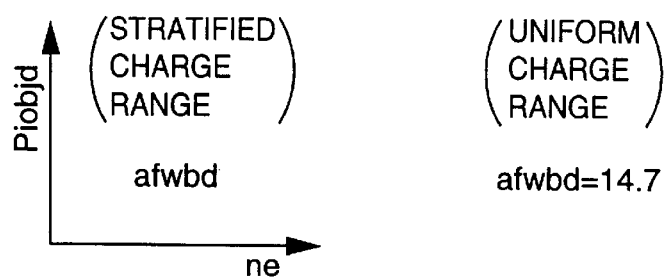
FIGS. 12A–12C are diagrams showing maps defining target air-fuel ratios for controlling the amount of injected fuel, injection timing and ignition timing, respectively.

Also, a setter 47b sets a target air-fuel ratio afwbd to be used mainly in normal operating conditions of the engine 1 for each operation mode selected by the operation mode setter 48. Referring to FIG. 12A, the setter 47b reads out the target air-fuel ratio afwbd from a map previously generated according to the second target load Piobjd and the engine speed ne in the stratified charge combustion mode, while it matches the target air-fuel ratio afwbd with the stoichiometric air-fuel ratio (A/F=14.7) in the uniform charge combustion mode. It is to be noted, however, that the air-fuel ratio may be made smaller than the stoichiometric air-fuel ratio (e.g., A/F=13 to 14) in high-load or high-speed ranges in the uniform charge combustion mode.

Then, a deviation calculator 47c calculates a deviation dafwb of the target air-fuel ratio afw0 calculated by the calculator 47a from the target air-fuel ratio afwb for controlling the amount of intake air set by the target air-fuel ratio setter 44. The target air-fuel ratio afw0 calculated by the calculator 47a is used as a final target air-fuel ratio afw in the transient operating state of the engine 1 when this deviation dafwb increases, while the target air-fuel ratio afwbd set by the setter 47b is used as the final target air-fuel ratio afw in the normal operating conditions of the engine 1 when this deviation dafwb is decreases.

The target air-fuel ratio generator 47 is configured as described above to simultaneously satisfy requirements regarding the engine output and emissions, as will be explained later. Its configuration may be simplified, however, by eliminating the setter 47b and the deviation calculator 47c and then always using the target air-fuel ratio afw0 obtained by the calculator 47a as the final target air-fuel ratio afw, for example.

In FIG. 6, designated by the numeral 60 is a calculator for calculating air-fuel ratio deviations dafwbd, dafw0 which are used for correcting the ignition timing in the transient operating state of the engine 1 as will be described later. The calculator 60 calculates the air-fuel ratio deviation dafwbd by using the equation dafwbd=afwbd−afw when the stratified charge combustion mode is selected by the operation mode setter 48, while it calculates the air-fuel ratio deviation dafw0 by using the equation dafw0=afw0−afw when the uniform charge combustion mode is selected.

Figure 11:
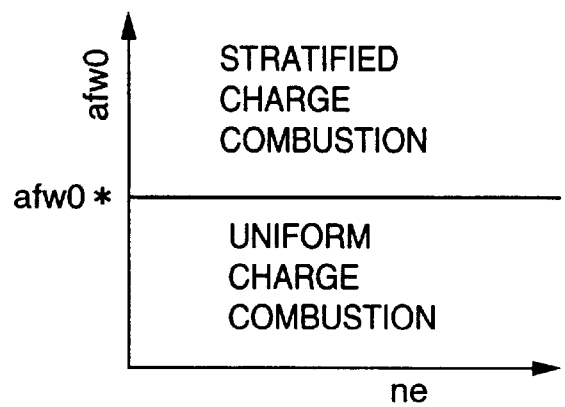
FIG. 11 is a diagram showing how an operation mode to be used for calculating the amount of injected fuel is selected.

The operation mode setter 48 selects an operation mode modf to be used for determining quick-responding control parameters based on the target air-fuel ratio afw0 for controlling the amount of injected fuel and the engine speed ne. Specifically, the operation mode setter 48 selects the uniform charge combustion mode when the target air-fuel ratio afw0 calculated by the calculator 47a is smaller than its lower limit reference value afw0* for the stratified charge combustion mode as shown in FIG. 11. Contrary to this, the operation mode setter 48 selects the stratified charge combustion mode when the target air-fuel ratio afw0 is equal to or higher than the lower limit reference value afw0*. The fuel injection pattern is switched when the operation mode modf has been switched as described above, and the operation mode of the engine 1 is eventually switched. Alternatively, fuel injection may be temporarily split so that the fuel is separately injected in the intake stroke and the compression stroke when the operation mode modf is switched between the uniform charge combustion mode and the stratified charge combustion mode. It is possible to avoid sudden changes in the state of combustion in this alternative approach.

The injection split ratio setter 49 sets the ratio between the amounts of fuel to be injected in the intake stroke and the compression stroke according to the operation mode modf selected by the operation mode setter 48. Specifically, the injection split ratio setter 49 sets the ratio of the amount of fuel to be injected in the intake stroke to 0% in the stratified charge combustion mode while it sets the same to 100% in the uniform charge combustion mode. When making time-split injection as described above, it is desirable to determine the fuel split ratio according to the target air-fuel ratio afw and the engine speed ne.

The injection quantity calculator 50 calculates the amounts of fuel to be injected based on the actual charging efficiency ce derived from the output from the airflow sensor 12, the target air-fuel ratio afwbd obtained by the target air-fuel ratio generator 47 and the fuel split ratio set by the injection split ratio setter 49. More specifically, the injection quantity calculator 50 calculates basic fuel injection quantities qbasep, qbased respectively for injection in the intake stroke and the compression stroke based on these values and a coefficient KGKF.

$$qbasep = KGKF \times (ce/afw) \times rqbasep$$

$$qbased = KGKF \times ce[i]/afw[i-1] - qbasep[i-1] \quad (5)$$

wherein rqbasep denotes the fuel split ratio, ce[i] denotes a current value (i.e., a value based on the amount of intake air detected immediately before compression stroke injection) of the charging efficiency, and afw[i−1] and qbasep[i−1] denote respective previous values (i.e., values based on detection immediately before intake stroke injection) of the target air-fuel ratio and the basic fuel injection quantity for the intake stroke. It can be seen from equation (5) above that the previous values of the target air-fuel ratio, etc. are used in calculating the basic fuel injection quantity for injection in the compression stroke. This is because the operation mode, the air-fuel ratio, etc. could vary between intake stroke injection and compression stroke injection, making it impossible to ensure consistent operation, if their current values (detected before compression stroke injection) are used.

Subsequently, final fuel injection quantities qinjp, qinjd for injection in the intake stroke and the compression stroke are derived from the respective basic fuel injection quantities qbasep, qbased taking into account correction values cdpfp, cdpfd according to the fuel pressure for injection in the intake stroke and the compression stroke, respectively, and various other correction values ctotal. Then, injection pulselengths Ti proportional to the final fuel injection quantities qinjp, qinjd are calculated.

$$qinjp = qbasep \times cdpfp \times (1+ctotal)$$

$$qinjd = qbased \times cdpfd \times (1+ctotal[i-1]) \quad (6)$$

wherein ctotal[i−1] denotes a previous values (i.e., a value based on detection immediately before intake stroke injection) of the correction value.

Figure 12B:
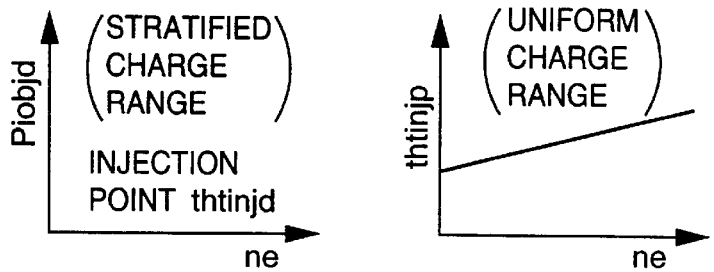

The injection timing setter 51 sets fuel injection points according to the operation mode modf selected by the operation mode setter 48. Referring to FIG. 12B, the injection timing setter 51 obtains an injection point thtinjd for the compression stroke injection from a map previously generated according to the second target load Piobjd and the engine speed ne in the stratified charge combustion mode, while it obtains an injection point thtinjp for the intake stroke injection from a map previously generated according to the engine speed ne in the uniform charge combustion mode.

For the sake of calculation, both of the injection points thtinjd, thtinjp are always given some values. In the stratified charge combustion mode, the value of the injection point thtinjd for the compression stroke injection is obtained from the pertinent map, while a fixed value is set as the injection point thtinjp for the intake stroke injection (although the intake stroke injection is not actually performed since the fuel split ratio rqbasep for the intake stroke injection is 0%). In the uniform charge combustion mode, the injection point thtinjp for the intake stroke injection is obtained from the pertinent map, while a fixed value (e.g., a particular point in time in an early part of the compression stroke) is set as the injection point thtinjp for the intake stroke injection. This fixed value is used for making additional fuel injection when the amount of fuel injected in the intake stroke alone is insufficient. Further, when making time-split injection, it is desirable to use data prepared for the stratified charge combustion mode as the injection point thtinjd for the compression stroke injection and obtain the injection point thtinjp for the intake stroke injection from a map previously generated according to the target air-fuel ratio afw and the engine speed ne.

The injection controller 52 outputs a pulse signal to the injector 7 in such a way that it injects the fuel during time periods corresponding to the injection pulselengths Ti calculated by the injection quantity calculator 50 the fuel injection points set by the injection timing setter 51.

Ignition Timing Control

Figure 12C:
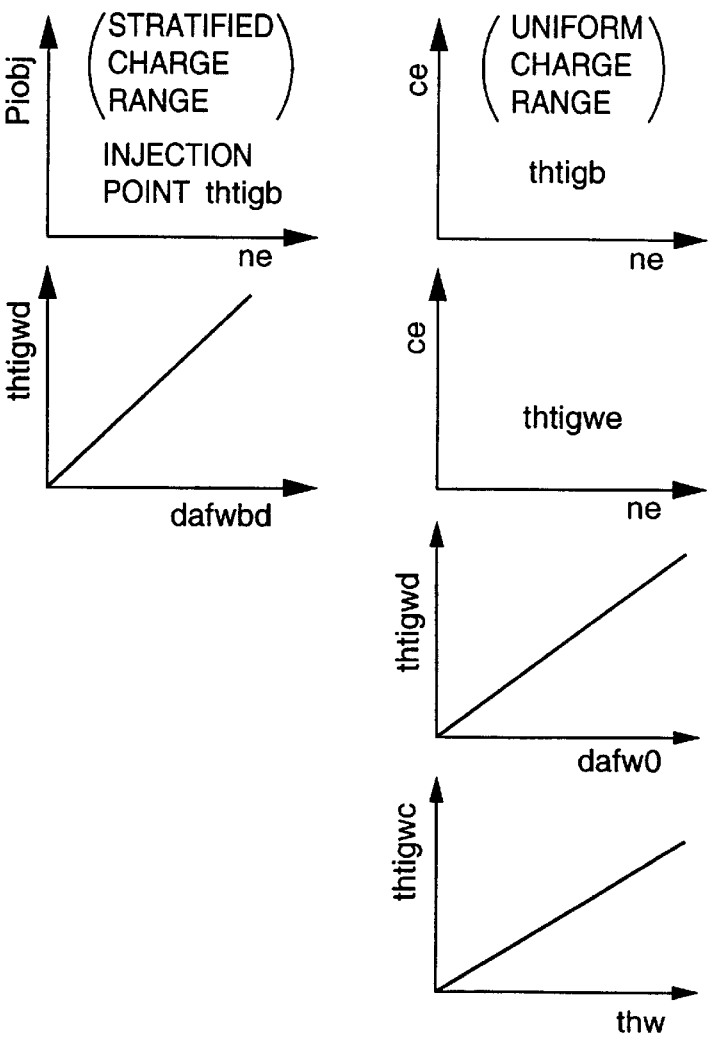

The ECU 40 further comprises a setter 53 for setting a basic ignition point thtigb and its correction values and an ignition timing calculator 54, which together act as means for controlling the ignition timing of the engine 1. The setter 53 sets the basic ignition point thtigb and various ignition timing correction values according to the operation mode modf selected by the operation mode setter 48. Referring to FIG. 12C, the setter 53 obtains the basic ignition point thtigb from a map previously generated according to the second target load Piobjd and the engine speed ne as well as a correction value thtigwd corresponding to the earlier-mentioned target air-fuel ratio deviation dafwbd from a previously generated table in the stratified charge combustion mode. While the basic ignition point thtigb is determined according to the second target load Piobjd and the engine speed ne corresponding to the target air-fuel ratio afwbd for the normal operating conditions of the engine 1, the target air-fuel ratio afw0 is used as the final target air-fuel ratio afw in the transient operating state of the engine 1, so that there occurs a deviation of the air-fuel ratio in transient operating state from that in the normal operating conditions. The aforementioned correction value thtigwd corresponding to the target air-fuel ratio deviation dafwbd is used to adjust the ignition timing according to this deviation of the air-fuel ratio.

In the uniform charge combustion mode, on the other hand, the setter 53 obtains the basic ignition point thtigb from a map previously generated according to the actual charging efficiency ce and the engine speed ne, a correction value thtigwe for EGR-on state from a map previously generated according to the actual charging efficiency ce and the engine speed ne, as well as a correction value thtigwd corresponding to the earlier-mentioned target air-fuel ratio deviation dafw0 and a cold-state correction value thtigwc corresponding to engine cooling water temperature thw from previously generated tables. As will be described later, the air-fuel ratio could go through a point where the amount of NOx emissions increases when the target air-fuel ratio afw0 becomes equal to or smaller than a specific value which is larger than the stoichiometric air-fuel ratio. The aforementioned correction value thtigwd corresponding to the target air-fuel ratio deviation dafw0 (=afw0−afw) is used to adjust the ignition timing according to a change in the air-fuel ratio to prevent the increase in the amount of NOx emissions when the final target air-fuel ratio afw is matched with the stoichiometric air-fuel ratio.

When the operation mode mods is switched from the stratified charge combustion mode to the uniform charge combustion mode during acceleration of the engine 1, the ignition timing is retarded by a specific time period to reduce variations in engine torque due to the switching of the operation mode mods. A specific retardation correction value thtigwf is preset for this purpose. When making time-split injection, it is desirable to obtain the basic ignition point from a table previously generated according to the target air-fuel ratio afw.

Subsequently, the ignition timing calculator 54 calculates an ignition point thtig based on the basic ignition point thtigb and the various correction values set by the setter 53 using the following equation:

$$thtig=thtigb-(thtigwd+thtigwe+thtigwc+thtigwf) \quad (7)$$

Since the direct injection engine 1 of this embodiment provided with the aforementioned control device A is switched between the stratified charge combustion mode and the uniform charge combustion mode according to its operating conditions and stratified charge combustion is made at an air-fuel ratio much higher than the stoichiometric air-fuel ratio in the stratified charge combustion mode, the fuel economy is significantly improved. Also in the stratified charge combustion mode, the amount of intake air is increased with the throttle opening increased to increase the air-fuel ratio while producing required engine torque. The amount of intake air, the amount of injected fuel, injection timing, ignition timing, as well as the EGR valve 27 and the swirl control valve 18 are controlled according to the operation mode, The control parameters are properly controlled taking into account their response characteristics. Specifically, the amount of intake air is controlled by calculating the target charging efficiency ceobj based on the target air-fuel ratio afwb for controlling the amount of intake air set in accordance with the target load, etc., obtaining the target volumetric efficiency veobj through a correction made in accordance with the intake air density, and then calculating the throttle opening based on the target volumetric efficiency veobj. This sequence makes it possible to control the throttle opening with high accuracy. On the other hand, the operation mode setter 48 selects the operating mode and the amount of injected fuel, injection timing, ignition timing, etc. are controlled based on the air-fuel ratio for controlling the amount of injected fuel obtained by the target air-fuel ratio generator 47 from the target load, actual charging efficiency, etc., so that the operating mode, air-fuel ratio, etc. are properly controlled during transient operating conditions of the engine 1 in which the charging efficiency varies.

Further, the first target load Piobj is used for controlling the amount of intake air whose response to a relevant control signal is slow, while the second target load Piobjd based on the imaginary charging efficiency ceimgd obtained through the delay operation is used for controlling the amount of injected fuel, etc. whose response to the relevant control signals is quick. This makes it possible to properly adjust operating timing of the individual control parameters.

In a typical gasoline engine in which the throttle opening varies in accordance with the amount of accelerator depression while maintaining standard operating conditions wherein the air-fuel ratio is matched with the stoichiometric air-fuel ratio in most operating ranges, the engine output varies corresponding to changes in the amount of intake air when the amount of accelerator depression and the throttle opening corresponding thereto quickly vary during engine acceleration, for instance, although there exists a time lag in the changes in the amount of intake air. Thus, if it is intended to perform output control to simulate such a typical gasoline engine, it is appropriate to regard the second target load Piobjd based on the imaginary charging efficiency ceimgd obtained through the delay operation as an actual target load.

It is therefore possible to obtain output torque characteristics similar to those of ordinary engines and a preferable engine profile by controlling such quick-responding control parameters as the amount of injected fuel based on the second target load Piobjd which is regarded as the actual target load. On the other hand, since changes in such parameters as the amount of intake air are associated with a more or less large time lag and they tend to vary rather slowly, the opening of the throttle valve 13, for instance, which is one of slow-responding control parameters is controlled according to the first target load Piobj calculated based on the imaginary charging efficiency ceimg which has not gone through the delay operation to prevent delay in responding to a control operation.

Control During Acceleration

Even if the delay of response of the slow-responding throttle opening which is a slow-responding control parameter is prevented as described above, it is impossible to avoid torque shock which would occur when the engine 1 is switched from the stratified charge combustion mode to the uniform charge combustion mode during acceleration.

Referring to FIGS. 13A–13E and 14, when the engine 1 is transferred from an idling state to an accelerating state as the vehicle is started and accelerated, the accelerator pedal is depressed by a driver so that the accelerator depression accel increases. The value of the first target load Piobj set by the target load setter 42 increases correspondingly as shown by a solid line in FIG. 13A (t=t1). As a consequence, the throttle opening tvoobj which is calculated based on the first target load Piobj increases as shown by a solid line in FIG. 13B and the throttle valve 13 is opened to the throttle opening tvoobj, whereby the charging efficiency ce of the relevant cylinder 2 increases as shown by a solid line in FIG. 13C with a slight delay.

Figure 13A:
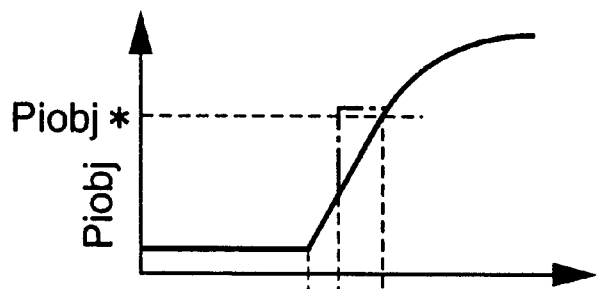
FIGS. 13A–13E are time charts showing how a first target load, throttle opening, actual charging efficiency, air-fuel ratio and ignition point vary during engine acceleration.
Figure 13B:
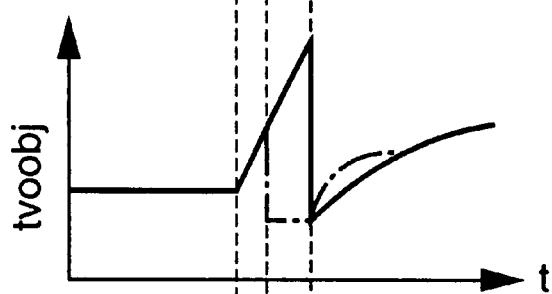
Figure 14:
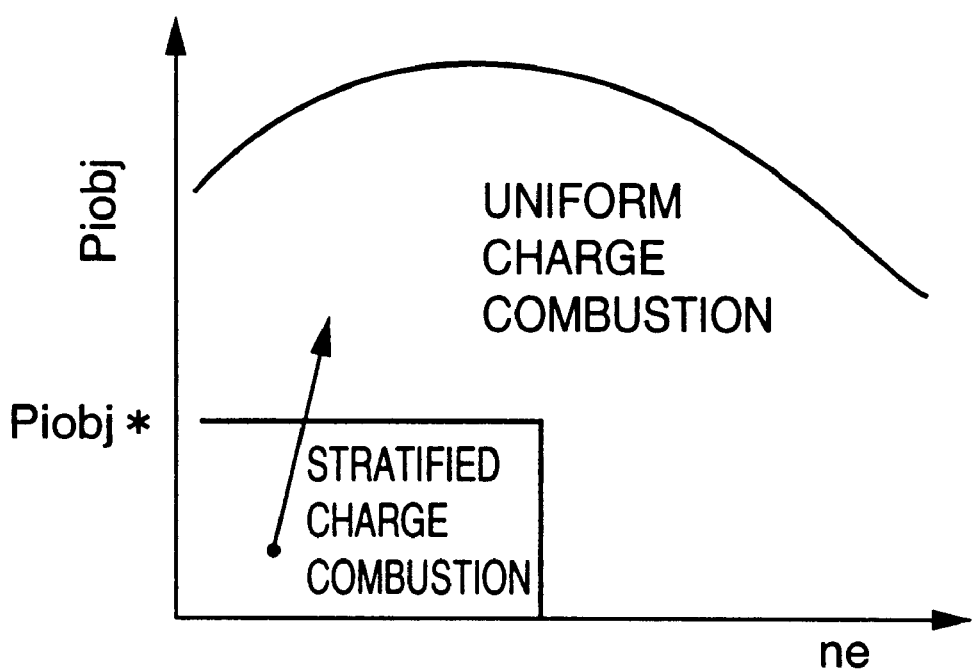
FIG. 14 is an explanatory diagram showing variations in operating conditions during engine acceleration.

Then, when the first target load Piobj exceeds the threshold value Piobj* (t=t3) as shown also in FIG. 14 after the actual opening of the throttle valve 13 has increased to a considerable extent, the operation mode mods is switched from the stratified charge combustion mode to the uniform charge combustion mode. Thus, the target air-fuel ratio setter 44 matches the target air-fuel ratio afwb for controlling the amount of intake air with the stoichiometric air-fuel ratio and the throttle opening tvoobj corresponding to the target air-fuel ratio afwb is significantly decreased as shown in FIG. 13B. This means that the throttle valve 13 is temporarily closed when the operation mode is switched.

Figure 13C:
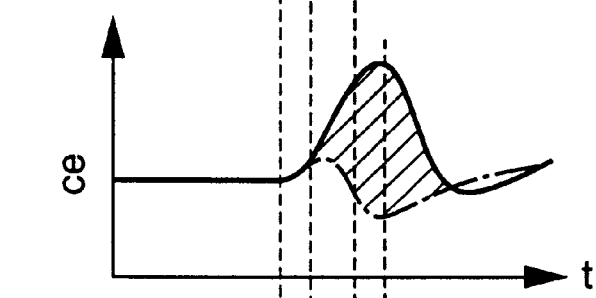

At the time of operation mode switching, the actual charging efficiency ce of the relevant cylinder 2 is extremely large as shown in FIG. 13C. Although the actual charging efficiency ce begins to decrease with a slight delay after the throttle valve 13 has been closed, a state of excessive intake air continues for a while as shown by hatching in FIG. 13C. On the other hand, when the first target load Piobj increases, the second target load Piobjd also increases with a slight delay. When the target air-fuel ratio afw0 for controlling the amount of injected fuel obtained by the target air-fuel ratio generator 47 based on the second target load Piobjd and the actual charging efficiency ce becomes smaller than the lower limit reference value afw0* for the stratified charge combustion mode (see FIG. 11), the operation mode modf is switched from the stratified charge combustion mode to the uniform charge combustion mode and the fuel is injected during the intake stroke of the relevant cylinder 2. Then, the amount of injected fuel is significantly increased so that the air-fuel ratio in the combustion chamber 4 becomes equal to the stoichiometric air-fuel ratio as shown by a solid line in FIG. 13D (t=t4).

When the operation mode modf is switched, both the charging efficiency and the amount of injected fuel could extremely increase, potentially causing a surge of torque shock. Thus, it is necessary to forcibly decrease the engine output by greatly retarding the ignition point thtig as shown by a solid line in FIG. 13E to prevent the torque shock. This would cause a significant deterioration in fuel economy, a decrease in converting performance of the catalytic converter 25 due to an increase in exhaust gas temperature, and a reduction in reliability.

In this embodiment, however, the mode change predictor 42f predicts the switching from the stratified charge combustion mode to the uniform charge combustion mode during acceleration of the engine 1 and the first target load Piobj is corrected to a value which will become valid immediately after switching to the uniform charge combustion mode before the operation mode modf is actually switched, making it possible to close the throttle valve 13 just before the operation mode switching and thereby reduce variations in engine torque. An operating routine for this corrective control operation is described referring to a flowchart shown in FIG. 15.

After engine startup, the engine speed ne and the accelerator depression accel are read based on the output signals from the engine speed sensor 33 and the accelerator depression sensor 34 and various sensor signals from the intake air temperature sensor 31, the atmospheric pressure sensor 32, etc. are entered to the ECU 40 in step S1. Next, the first and second target loads Piobj, Piobjd are set based on the engine speed ne and the accelerator depression accel in step S2.

In step S3, a judgment is made as to whether the basic operation mode mods selected by the operation mode setter 43 according to the first target load Piobj is the stratified charge combustion mode. If the judgment result is in the negative, that is, the engine 1 is in the uniform charge combustion mode, the operation flow proceeds to step S7. On the contrary, if the judgment result is in the affirmative, that is, the engine 1 is in the stratified charge combustion mode, the operation flow proceeds to step S4, in which a target load increment Pi is obtained by subtracting a previous value Piobj[i−1] of the first target load Piobj from its current value Piobj[i].

In step S5, the target load increment Pi is compared with a predefined reference value C1 and a prediction is made as to whether the operation mode is switched or not based on the result of comparison. Specifically, if the judgment result in step S5 is in the affirmative, that is, the target load increment Pi is larger than the reference value C1 (Pi>C1), it is judged that the operation mode will be switched to the uniform charge combustion mode because the target load of the engine 1 is increasing rapidly. In this case, the operation flow proceeds to step S6. If, however, the judgment result in step S5 is in the negative, that is, the target load increment Pi is not larger than the reference value C1 (Pi C1), it is judged that the operation mode will not be switched because the change in the target load small. In this case, the operation flow proceeds to step S7.

When it has been judged that the operation mode would be switched to the uniform charge combustion mode and the operation flow has proceeded to step S6, the first target load Piobj (=Piobj*) which will become valid immediately after switching to the uniform charge combustion mode is read out from the relevant map and the value thus read is set as the first target load Piobj. Thus, the first target load Piobj is corrected, or updated, to the value which will become valid immediately after switching to the uniform charge combustion mode before the operation mode modf is actually switched when the switching from the stratified charge combustion mode to the uniform charge combustion mode has been predicted.

Subsequently, the throttle opening tvoobj, fuel injection quantity qinj, injection point thtinj, ignition point thtig, etc. are obtained based on the first and second target loads Piobj, Piobjd in step S7. Specifically, the target air-fuel ratio setter 44 sets the target air-fuel ratio afwb for controlling the amount of intake air based on the first target load Piobj updated in step S6, the target charging efficiency calculator 45 calculates the target charging efficiency ceobj, and the throttle opening calculator 46 calculates the throttle opening tvoobj. It is understood from the foregoing discussion that the first target load Piobj to be used immediately after switching to the uniform charge combustion mode is set before the operation mode modf is actually switched, and the throttle opening tvoobj is calculated according to the updated first target load Piobj. Then, the control operation of the throttle valve 13, the injector 7, the ignition circuit 5, etc. is executed in step S8 and the operation flow escapes the routine of FIG. 15.

The aforementioned step S2 is performed by the target load setter 42 which sets the first and second target loads Piobj, Piobjd of the engine 1, while steps S7 and S8 are performed by the throttle controller for controlling the throttle valve 13 according to the first target load Piobj set by the target load setter 42.

Also, steps S3 to S5 are performed by the mode change predictor 42f which predicts the switching from the stratified charge combustion mode to the uniform charge combustion mode during acceleration of the engine 1, while step S6 is performed by a throttle control corrector which corrects, or updates, the throttle opening tvoobj (the control target value set by the throttle controller) so that it becomes equal to the target value for the uniform charge combustion mode by correcting the first target load Piobj before the combustion mode is switched when its switching has been predicted by the mode change predictor 42f.

Main features and advantages of the direct injection engine control device A according to the present embodiment are now described below.

When the driver presses down on the accelerator pedal while starting and accelerating the vehicle, the accelerator depression accel increases and the value of the first target load Piobj set by the target load setter 42 increases as shown by the solid line in FIG. 13A (t=t1). Then, the mode change predictor 42f predicts the switching of the operation mode based on the increment Pi of the first target load Piobj and the correction circuit 42g corrects the first target load Piobj to the value which will become valid immediately after switching to the uniform charge combustion mode as shown by a dot-and-dash line in FIG. 13A (t=t2).

As a consequence, the operation mode mods is switched to the uniform charge combustion mode, the target air-fuel ratio afwb for controlling the amount of intake air is matched with the stoichiometric air-fuel ratio, and the throttle opening tvoobj is significantly decreased as shown by a dot-and-dash line in FIG. 13B. Since the throttle valve 13 is closed as a result of the decrease in the throttle opening tvoobj, the actual charging efficiency ce of the relevant cylinder 2 begins to decrease before it becomes so high. The target air-fuel ratio afw0 for controlling the amount of injected fuel is obtained based on the actual charging efficiency ce and the second target load Piobjd. When the target air-fuel ratio afw0 thus obtained becomes smaller than the lower limit reference value afw0* for the stratified charge combustion mode, the operation mode modf is switched from the stratified charge combustion mode to the uniform charge combustion mode (t=t3) and the fuel is injected during the intake stroke of the relevant cylinder 2.

Figure 13D:
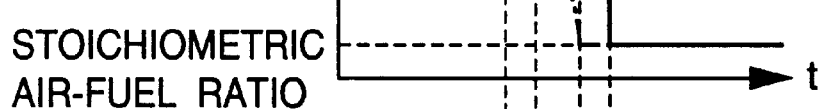
Figure 13E:
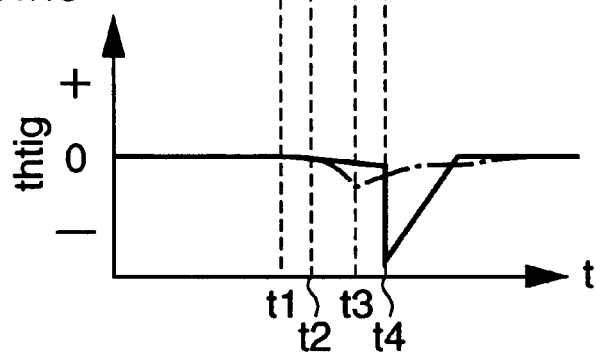

Since the actual charging efficiency ce in the combustion chamber 4 is sufficiently small and is approximately equal to a target level in the uniform charge combustion mode at this point as shown in FIG. 13C, the engine torque does not greatly vary even when the air-fuel ratio is matched with the stoichiometric air-fuel ratio as shown in FIG. 13D. In other words, it is possible to reduce engine torque variations to a small level even when the operation mode modf is switched simply by slightly correcting the ignition point thtig as shown in FIG. 13E.

Since the switching from the stratified charge combustion mode to the uniform charge combustion mode during acceleration of the engine 1 is predicted and the throttle valve 13 is closed just before the operation mode switching in the direct injection engine control device A of the foregoing embodiment, it is possible to prevent the charging efficiency ce in each cylinder 2 from becoming excessively high when the operation mode modf is switched. Consequently, it becomes possible to prevent the torque shock without causing a deterioration in the acceleration performance of the engine 1 or in fuel economy. Furthermore, as it is no longer necessary to considerably retard the ignition point thtig unlike the case of the prior art, the converting performance of the catalytic converter 25 will not deteriorate due to an excessive increase in the exhaust gas temperature.

Moreover, since the switching of the operation mode is predicted based on the increment Pi of the first target load Piobj set by the target load setter 42 in the foregoing embodiment, it is possible to predict the operation mode switching of the engine 1 with high accuracy.

Other Embodiments

The invention is not limited to the above-described embodiment but includes various other embodiments and modifications thereof. For example, although the first target load Piobj is corrected when the engine 1 is currently in the stratified charge combustion mode and the switching to the uniform charge combustion mode has been predicted in the foregoing embodiment, this correction may be made only when the engine 1 is currently in the stratified charge combustion mode and has transferred from an idling state to an accelerating state.

Generally speaking, when the engine 1 transfers from the idling state to the accelerating state, the driver is apt to perceive the torque shock since the engine speed ne is still low. Especially during startup and subsequent acceleration of the vehicle when its running speed is quite low, the driver is most sensitive to the torque shock. It is therefore particularly advantageous to reduce engine torque fluctuations in such a low-speed range.

Although the target load of the engine 1 is expressed by the indicated mean effective pressure Pi in the foregoing embodiment, the invention is not limited thereto. As an alternative, the target load may be expressed by a brake mean effective pressure Pe. Furthermore, although the switching of the combustion mode is predicted based on variations in the target load Piobj of the engine 1 in the foregoing embodiment, the invention is not limited thereto either. As an example, the switching of the combustion mode may be predicted based on a change in the imaginary charging efficiency ceimg, imaginary volumetric efficiency veimg or accelerator depression accel.

Main features and advantages of the aforementioned control device for the direct injection engine are as follows.

In a direct injection engine which is provided with a fuel injection valve for injecting fuel directly into a combustion chamber in a cylinder, a spark plug, and a throttle valve for regulating the amount of intake air introduced into the combustion chamber, there is provided a control device comprising a mode setter for switchingly setting a stratified charge combustion mode, in which the fuel is injected in a compression stroke of the cylinder to produce a stratified mixture around the spark plug and burnt in a stratified state, and a uniform charge combustion mode, in which the fuel is injected in an intake stroke of the cylinder to produce a uniformly distributed mixture therein and burnt in a uniform state. The inventive control device is further provided with a target load setter for setting a target load of the engine according at least to the amount of depression of an accelerator pedal, a throttle controller for controlling the opening of the throttle valve according at least to the target load set by the target load setter, a mode change predictor for predicting a switching from the stratified charge combustion mode to the uniform charge combustion mode, and a throttle control corrector for correcting a control target value for the throttle valve set by the throttle controller so that the control target value approaches a target value which will become valid in the uniform charge combustion mode prior to the switching to the uniform charge combustion mode when such combustion mode switching has been predicted by the mode change predictor.

According to this construction, when the switching from the stratified charge combustion mode to the uniform charge combustion mode is predicted by the mode change predictor during acceleration of the vehicle, the control target value for the throttle valve set by the throttle controller is corrected so that it approaches the target value which will become valid in the uniform charge combustion mode. Thus, when the engine is subsequently switched to the uniform charge combustion mode, the charging efficiency in the cylinder is already close to its target level to be achieved in the uniform charge combustion mode, so that variations in engine torque are reduced. This means that it is possible to prevent torque shock at combustion mode switching without causing a deterioration in fuel economy or in vehicle acceleration performance in this invention due to great retardation of the ignition timing.

The target load setter may be so constructed as to set the target load of the engine based on the amount of depression of the accelerator pedal and engine speed. This makes it possible to properly set the target load of the engine.

The control device may further comprise a fuel injection controller which controls the amount of fuel injected by the fuel injection valve in such a way that the air-fuel ratio in the combustion chamber becomes higher than the stoichiometric air-fuel ratio in the stratified charge combustion mode and the air-fuel ratio in the combustion chamber becomes approximately equal to or lower than the stoichiometric air-fuel ratio in the uniform charge combustion mode. When such a fuel injection controller is provided, the engine torque tends to fluctuate because the air-fuel ratio is considerably reduced (richer mixture) when the engine is switched from the stratified charge combustion mode to the uniform charge combustion mode. However, the aforementioned throttle valve control operation effectively works to suppress fluctuations in the engine torque especially in the control device provided with the fuel injection controller.

Preferably, the mode change predictor is so constructed as to predict the combustion mode switching based on a change in the target load set by the target load setter. The mode change predictor thus constructed can predict the combustion mode switching with high accuracy based on the change in the target load of the engine when the target load sharply increases, for example.

It is preferable that the throttle control corrector be so constructed as to make a correction to the throttle valve control operation when the engine is operated in low-speed, low-load conditions (e.g., when the engine is idling) and the combustion mode switching has been predicted by the mode change predictor. When the engine transfers from its idling state to accelerating state, the driver is apt to perceive the torque shock since the engine speed is still low. Especially during startup and subsequent acceleration of the vehicle when its running speed is quite low, the driver is most sensitive to the torque shock. It is therefore particularly advantageous to reduce engine torque fluctuations by performing the throttle valve control operation in such a low-speed range.

It is also preferable that the control device further comprises a delay processor for performing a delay operation on the target load set by the target load setter and a fuel injection controller for controlling the amount of injected fuel according to the target load processed by the delay processor. In this construction, the amount of fuel injected by the fuel injection valve is controlled according to the target load processed by the delay processor, while the opening of the throttle valve is controlled according to the unprocessed target load of the engine. This means that the amount of intake air, which is one of the slow-responding control parameters, is controlled using raw information, whereas the amount of injected fuel, which is one of the quick-responding control parameters, is controlled by using information which has gone through the delay operation. Consequently, it is possible to reduce deviation in the timing of controlling the amount of intake air and the amount of injected fuel and thereby improve the precision of control operation.

It is also advantageous for the control device to further comprise a delay processor for performing a delay operation on the target load set by the target load setter and an ignition timing controller for controlling ignition timing according to the target load processed by the delay processor. In this construction, the amount of intake air which is slow-responding is controlled using raw information, whereas the ignition timing which is quick-responding is controlled by using information which has gone through the delay operation. This makes it possible to reduce deviation in the timing of controlling the amount of intake air and the ignition timing and thereby improve the precision of control operation.

In the control device, the target load setter, the throttle controller, the mode change predictor and the throttle control corrector are constructed as follows. Specifically, the control device further comprises a memory storing data on a predetermined relationship between accelerator depression and engine speed and imaginary volumetric efficiency whereby output performance required for the engine under standard atmospheric conditions and under standard operating conditions, in which the air-fuel ratio is maintained at the stoichiometric air-fuel ratio, is obtained, wherein the target load setter calculates an imaginary volumetric efficiency corresponding to the actual accelerator depression and engine speed from a value stored in the memory, calculates an imaginary charging efficiency from the imaginary volumetric efficiency taking into account a current intake air density, and sets the target load based on the imaginary charging efficiency, the throttle controller calculates the throttle opening based on the target load, the mode change predictor predicts the switching from the stratified charge combustion mode to the uniform charge combustion mode based on the rate of increase in the throttle opening, and the throttle control corrector corrects the target value prior to the combustion mode switching when it has been predicted so that the target value is matched with the value which will become valid after the switching to the uniform charge combustion mode and the throttle opening approaches its control target value which will become valid in the uniform charge combustion mode as a result of correction to the target value.

Preferably, the control device further comprises a fuel injection controller, wherein the target load setter is so constructed as to set a first target load based on the imaginary charging efficiency on which no delay operation has been performed as well as a second target load based on an imaginary charging efficiency on which a delay operation has been performed, and the fuel injection controller is so constructed as to calculate a target air-fuel ratio to be used during engine acceleration based on the second target load and an actual charging efficiency determined by an intake air quantity sensor and set the amount of fuel to be injected during engine acceleration based on the target air-fuel ratio.

The target load setter, the mode change predictor and the throttle control corrector of the control device may also be constructed as follows. Specifically, the control device further comprises a memory storing data on a predetermined relationship between accelerator depression and engine speed and imaginary volumetric efficiency whereby output performance required for the engine under standard atmospheric conditions and under standard operating conditions, in which the air-fuel ratio is maintained at the stoichiometric air-fuel ratio, is obtained, and a fuel injection controller, wherein the target load setter calculates an imaginary volumetric efficiency corresponding to the actual accelerator depression and engine speed from a value stored in the memory, calculates an imaginary charging efficiency from the imaginary volumetric efficiency taking into account a current intake air density, makes a first-order delay correction to the imaginary charging efficiency as a delay operation, and sets a first target load based on the imaginary charging efficiency on which no delay operation has been performed as well as a second target load based on an imaginary charging efficiency on which the delay operation has been performed, the mode change predictor predicts the switching from the stratified charge combustion mode to the uniform charge combustion mode based on a change in the first target load, the throttle control corrector corrects the first target load prior to the combustion mode switching when it has been predicted so that the first target load is matched with the value which will become valid after the switching to the uniform charge combustion mode and the throttle opening approaches its control target value which will become valid in the uniform charge combustion mode as a result of correction to the first target load, and the fuel injection controller is so constructed as to calculate a target air-fuel ratio to be used during engine acceleration based on the second target load and an actual charging efficiency determined by an intake air quantity sensor and set the amount of fuel to be injected during engine acceleration based on the target air-fuel ratio.

Furthermore, the control device may further comprise an ignition timing setter for setting an ignition point at which the mixture is ignited during engine acceleration based on the target air-fuel ratio.

The aforementioned target load setter makes the first-order delay correction to the imaginary charging efficiency using the following equation, for example:

$$ceimgd = (1-\alpha) \times ceimg + \alpha \times ceimgd[i-1]$$

wherein ceimg denotes the imaginary charging efficiency, ceimgd[i−1] denotes a previous value of ceimgd and a denotes a coefficient (0<α<1).

It would be recognized from the foregoing discussion that the inventive control device for a direct injection engine can reduce engine torque fluctuations and prevent the torque shock which could potentially occur when the engine is switched from the uniform charge combustion mode to the stratified charge combustion mode without causing a deterioration in fuel economy or in vehicle acceleration performance due to great retardation of the ignition timing. The inventive control device is therefore highly useful for implementation in vehicle engines, for example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A control device for controlling a direct injection engine provided with a fuel injection valve for injecting fuel directly into a combustion chamber in a cylinder thereof, a spark plug, and a throttle valve for regulating the amount of intake air introduced into the combustion chamber, comprising:

a mode setter for switchingly setting a stratified charge combustion mode where the fuel is injected in a compression stroke of the cylinder to produce a stratified mixture around the spark plug and burnt in a stratified state and a uniform charge combustion mode where the fuel is injected in an intake stroke of the cylinder to produce a uniformly distributed mixture therein and burnt in a uniform state;

a target load setter for setting a target load of the engine according at least to the amount of depression of an accelerator pedal;

a throttle controller for controlling the opening of the throttle valve according at least to the target load set by the target load setter;

a mode change predictor for predicting a switching from the stratified charge combustion mode to the uniform charge combustion mode; and a throttle control corrector for correcting a control target value for the throttle valve set by the throttle controller so that the control target value approaches a target value which will become valid in the uniform charge combustion mode prior to the switching to the uniform charge combustion mode when such combustion mode switching has been predicted by the mode change predictor.

2. The control device according to claim 1, wherein the target load setter sets the target load of the engine based on the amount of depression of the accelerator pedal and engine speed.

3. The control device according to claim 1, further comprising a fuel injection controller for controlling the amount of fuel injected by the fuel injection valve in such a way that the air-fuel ratio in the combustion chamber becomes higher than the stoichiometric air-fuel ratio in the stratified charge combustion mode and the air-fuel ratio in the combustion chamber becomes approximately equal to or lower than the stoichiometric air-fuel ratio in the uniform charge combustion mode.

4. The control device according to claim 1, wherein the mode change predictor predicts the combustion mode switching based on a change in the target load set by the target load setter.

5. The control device according to claim 1, wherein the throttle control corrector makes a correction to throttle valve control operation when the engine is operated in low-speed, low-load conditions and the combustion mode switching has been predicted by the mode change predictor.

6. The control device according to claim 5, wherein the throttle control corrector makes a correction to the throttle valve control operation when the engine is idling and the combustion mode switching has been predicted by the mode change predictor.

7. The control device according to claim 2, further comprising:

a delay processor for performing a delay operation on the target load set by the target load setter; and a fuel injection controller for controlling the amount of injected fuel according to the target load processed by the delay processor.

8. The control device according to claim 2, further comprising:

a delay processor for performing a delay operation on the target load set by the target load setter; and an ignition timing controller for controlling ignition timing according to the target load processed by the delay processor.

9. The control device according to claim 1, further comprising:

a memory for storing data on a predetermined relationship between accelerator depression and engine speed and imaginary volumetric efficiency whereby output performance required for the engine under standard atmospheric conditions and under standard operating conditions, in which the air-fuel ratio is maintained at the stoichiometric air-fuel ratio, is obtained;

wherein the target load setter calculates an imaginary volumetric efficiency corresponding to the actual accelerator depression and engine speed from a value stored in the memory, calculates an imaginary charging efficiency from the imaginary volumetric efficiency taking into account a current intake air density, and sets the target load based on the imaginary charging efficiency;

the throttle controller calculates the throttle opening based on the target load;

the mode change predictor predicts the switching from the stratified charge combustion mode to the uniform charge combustion mode based on the rate of increase in the throttle opening; and the throttle control corrector corrects the target value prior to the combustion mode switching when it has been predicted so that the target value is matched with the value which will become valid after the switching to the uniform charge combustion mode and the throttle opening approaches its control target value which will become valid in the uniform charge combustion mode as a result of correction to the target value.

10. The control device according to claim 9, further comprising:

a fuel injection controller;

wherein the target load setter is so constructed as to set a first target load based on the imaginary charging efficiency on which no delay operation has been performed as well as a second target load based on an imaginary charging efficiency on which a delay operation has been performed; and the fuel injection controller calculates a target air-fuel ratio to be used during engine acceleration based on the second target load and an actual charging efficiency determined by an intake air quantity sensor and set the amount of fuel to be injected during engine acceleration based on the target air-fuel ratio.

11. The control device according to claim 1, further comprising:

a memory for storing data on a predetermined relationship between accelerator depression and engine speed and imaginary volumetric efficiency whereby output performance required for the engine under standard atmospheric conditions and under standard operating conditions, in which the air-fuel ratio is maintained at the stoichiometric air-fuel ratio, is obtained; and a fuel injection controller;

wherein the target load setter calculates an imaginary volumetric efficiency corresponding to the actual accelerator depression and engine speed from a value stored in the memory, calculates an imaginary charging efficiency from the imaginary volumetric efficiency taking into account a current intake air density, makes a first-order delay correction to the imaginary charging efficiency as a delay operation, and sets a first target load based on the imaginary charging efficiency on which no delay operation has been performed as well as a second target load based on an imaginary charging efficiency on which the delay operation has been performed;

the mode change predictor predicts the switching from the stratified charge combustion mode to the uniform charge combustion mode based on a change in the first target load;

the throttle control corrector corrects the first target load prior to the combustion mode switching when it has been predicted so that the first target load is matched with the value which will become valid after the switching to the uniform charge combustion mode and the throttle opening approaches its control target value which will become valid in the uniform charge combustion mode as a result of correction to the first target load; and the fuel injection controller calculates a target air-fuel ratio to be used during engine acceleration based on the second target load and an actual charging efficiency determined by an intake air quantity sensor and set the amount of fuel to be injected during engine acceleration based on the target air-fuel ratio.

12. The control device according to claim 11, further comprising an ignition timing setter for setting an ignition point at which the mixture is ignited during engine acceleration based on the target air-fuel ratio.

13. The control device according to claim 11, wherein the target load setter makes the first-order delay correction to the imaginary charging efficiency using the following equation:

$$ceimgd = (1-\alpha) \times ceimg + \alpha \times ceimgd[i-1]$$

wherein ceimg denotes the imaginary charging efficiency, ceimgd[i−1] denotes a previous value of ceimgd and $\alpha$ denotes a coefficient ($0 < \alpha < 1$).

14. An injection engine comprising:

a cylinder having a combustion chamber;

a fuel injection valve for injecting fuel directly into the combustion chamber;

a spark plug;

a throttle valve for regulating the amount of intake air introduced into the combustion chamber; and a controller for switchingly setting a stratified charge combustion mode where the fuel is injected in a compression stroke of the cylinder to produce a stratified mixture around the spark plug and burnt in a stratified state and a uniform charge combustion mode where the fuel is injected in an intake stroke of the cylinder to produce a uniformly distributed mixture therein and burnt in a uniform state, setting a target load according at least to the amount of depression of an accelerator pedal, controlling the opening of the throttle valve according at least to the set target load, predicting a switching from the stratified charge combustion mode to the uniform charge combustion mode, and correcting a control target value for the set throttle valve so that the control target value approaches a target value which will become valid in the uniform charge combustion mode prior to the switching to the uniform charge combustion mode when such combustion mode switching has been predicted.

15. The injection engine according to claim 14, wherein the controller sets the target load based on the amount of depression of the accelerator pedal and engine speed.

16. The injection engine according to claim 14, wherein the controller further controls the amount of fuel injected by the fuel injection valve in such a way that the air-fuel ratio in the combustion chamber becomes higher than the stoichiometric air-fuel ratio in the stratified charge combustion mode and the air-fuel ratio in the combustion chamber becomes approximately equal to or lower than the stoichiometric air-fuel ratio in the uniform charge combustion mode.

17. The injection engine according to claim 14, wherein the controller predicts the combustion mode switching based on a change in the set target load.

18. The injection engine according to claim 14, wherein the controller makes a correction to throttle valve control operation when a low-speed operation is executed, low-load conditions and the combustion mode switching has been predicted.

19. The injection engine according to claim 14, further comprising:

a memory for storing data on a predetermined relationship between accelerator depression and engine speed and imaginary volumetric efficiency whereby output performance required for standard atmospheric conditions and standard operating conditions, in which the air-fuel ratio is maintained at the stoichiometric air-fuel ratio, is obtained;

wherein the controller calculates an imaginary volumetric efficiency corresponding to the actual accelerator depression and engine speed from a value stored in the memory, calculates an imaginary charging efficiency from the imaginary volumetric efficiency taking into account a current intake air density, and sets the target load based on the imaginary charging efficiency, and calculates the throttle opening based on the target load, and predicts the switching from the stratified charge combustion mode to the uniform charge combustion mode based on the rate of increase in the throttle opening, and corrects the target value prior to the combustion mode switching when it has been predicted so that the target value is matched with the value which will become valid after the switching to the uniform charge combustion mode and the throttle opening approaches its control target value which will become valid in the uniform charge combustion mode as a result of correction to the target value.

20. The injection engine according to claim 14, further comprising:

a memory for storing data on a predetermined relationship between accelerator depression and engine speed and imaginary volumetric efficiency whereby output performance required for standard atmospheric conditions and standard operating conditions, in which the air-fuel ratio is maintained at the stoichiometric air-fuel ratio, is obtained; and a fuel injection controller;

wherein the controller calculates an imaginary volumetric efficiency corresponding to the actual accelerator depression and engine speed from a value stored in the memory, calculates an imaginary charging efficiency from the imaginary volumetric efficiency taking into account a current intake air density, makes a first-order delay correction to the imaginary charging efficiency as a delay operation, and sets a first target load based on the imaginary charging efficiency on which no delay operation has been performed as well as a second target load based on an imaginary charging efficiency on which the delay operation has been performed, and predicts the switching from the stratified charge combustion mode to the uniform charge combustion mode based on a change in the first target load, and corrects the first target load prior to the combustion mode switching when it has been predicted so that the first target load is matched with the value which will become valid after the switching to the uniform charge combustion mode and the throttle opening approaches its control target value which will become valid in the uniform charge combustion mode as a result of correction to the first target load, and calculates a target air-fuel ratio to be used during engine acceleration based on the second target load and an actual charging efficiency determined by an intake air quantity sensor and set the amount of fuel to be injected during engine acceleration based on the target air-fuel ratio.

\* \* \* \* \*